(12) United States Patent
Saito et al.

(10) Patent No.: US 12,500,795 B2
(45) Date of Patent: Dec. 16, 2025

(54) ELECTRONIC CONTROL DEVICE

(71) Applicant: Panasonic Intellectual Property Management Co., Ltd., Osaka (JP)

(72) Inventors: Yoshiyuki Saito, Tokyo (JP); Takeshi Fujii, Osaka (JP); Yasuhiko Sasaki, Tokyo (JP); Tomohide Kamiyama, Tokyo (JP); Masaya Hattori, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 144 days.

(21) Appl. No.: 18/263,278

(22) PCT Filed: Feb. 3, 2022

(86) PCT No.: PCT/JP2022/004305
§ 371 (c)(1),
(2) Date: Jul. 27, 2023

(87) PCT Pub. No.: WO2022/168922
PCT Pub. Date: Aug. 11, 2022

(65) Prior Publication Data
US 2024/0121138 A1 Apr. 11, 2024

(30) Foreign Application Priority Data

Feb. 4, 2021 (JP) .................................. 2021-016913
Dec. 28, 2021 (JP) .................................. 2021-213784

(51) Int. Cl.
*H04L 25/00* (2006.01)
*H04B 1/3822* (2015.01)
(Continued)

(52) U.S. Cl.
CPC ....... *H04L 25/0276* (2013.01); *H04B 1/3822* (2013.01); *H04B 1/56* (2013.01);
(Continued)

(58) Field of Classification Search
None
See application file for complete search history.

(56) References Cited

U.S. PATENT DOCUMENTS

| | | | |
|---|---|---|---|
| 7,557,676 B2 * | 7/2009 | Tomonari | H03H 7/38 379/412 |
| 2012/0249257 A1 * | 10/2012 | Takahashi | H03H 1/02 333/172 |

FOREIGN PATENT DOCUMENTS

| | | |
|---|---|---|
| JP | 06-077324 U | 10/1994 |
| JP | 2007-235363 A | 9/2007 |

(Continued)

OTHER PUBLICATIONS

International Search Report issued on May 10, 2022 in International Patent Application No. PCT/JP2022/004305, with English translation.

*Primary Examiner* — Anh Q Tran
(74) *Attorney, Agent, or Firm* — Rimon P.C.

(57) ABSTRACT

An electronic control device includes: a first input-output terminal and a second input-output terminal through which differential signals are input and output; a transceiver integrated circuit (IC) that transmits and receives the differential signals; a first line that connects the first input-output terminal and the transceiver IC; and a second line that connects the second input-output terminal and the transceiver IC. A first capacitance that is a capacitance between the first line and a ground is at least 80 pF and at most 220 pF, and a second capacitance that is a capacitance between the second line and the ground is at least 80 pF and at most 220 pF.

20 Claims, 14 Drawing Sheets

(51) Int. Cl.
  *H04B 1/56*    (2006.01)
  *H04B 1/58*    (2006.01)
  *H04L 25/02*   (2006.01)
  *H04L 25/08*   (2006.01)
  *H04L 12/40*   (2006.01)

(52) U.S. Cl.
  CPC ........... *H04B 1/581* (2013.01); *H04L 25/085* (2013.01); *H04L 2012/40215* (2013.01)

(56) References Cited

FOREIGN PATENT DOCUMENTS

| | | | | |
|---|---|---|---|---|
| JP | 2013187249 | A | * | 9/2013 |
| JP | 2014-160690 | A | | 9/2014 |
| JP | 2017-130917 | A | | 7/2017 |
| JP | 2019-004130 | A | | 1/2019 |
| JP | 6498096 | B2 | | 4/2019 |
| JP | 2019-205119 | A | | 11/2019 |

* cited by examiner

FIG. 6

| | Capacitance between ground and differential signal wires "CP1 = CP2 = xx pF" | | | | | | | |
|---|---|---|---|---|---|---|---|---|
| | 70 pF | 80 pF | 100 pF | 150 pF | 200 pF | 220 pF | 230 pF | 240 pF |
| Cut-off frequency fc (MHz) | 39.8 | 34.7 | 27.5 | 18.6 | 13.8 | 12.6 | 12.0 | 11.5 |

ELECTRONIC CONTROL DEVICE

CROSS-REFERENCE OF RELATED APPLICATIONS

This application is the U.S. National Phase under 35 U.S.C. § 371 of International Patent Application No. PCT/JP2022/004305, filed on Feb. 3, 2022, which in turn claims the benefit of Japanese Patent Application No. 2021-016913, filed on Feb. 4, 2021, and Japanese Patent Application No. 2021-213784, filed on Dec. 28, 2021, the entire disclosures of which Applications are incorporated by reference herein.

TECHNICAL FIELD

The present disclosure relates to an electronic control device that performs communication by a differential transmission method.

BACKGROUND ART

An electronic control device that uses a controller area network (CAN) that is a vehicle communication standard has been known. The CAN adopts a differential transmission method for transmitting data by using a potential difference between two communication lines. In order to securely transmit data, it is necessary to take measures against noise and for overvoltage protection. Patent Literature (PTL) 1 discloses an electronic control device that includes a common mode noise filter and a zener diode, in order to take measures against noise and for overvoltage protection.

CITATION LIST

Patent Literature

PTL 1: Japanese Patent No. 6498096

SUMMARY OF INVENTION

Technical Problem

However, in a conventional electronic control device, a communication error may occur if a high voltage is input to a communication line.

The present disclosure is to address the above problem, and an object thereof is to provide an electronic control device that can reduce the occurrence of communication errors.

Solution to Problem

An electronic control device according to an aspect of the present disclosure includes: a first input-output terminal and a second input-output terminal through which differential signals are input and output; a transceiver integrated circuit (IC) that transmits and receives the differential signals; a first line that connects the first input-output terminal and the transceiver IC; and a second line that connects the second input-output terminal and the transceiver IC. A first capacitance that is a capacitance between the first line and a ground is at least 80 pF and at most 220 pF, and a second capacitance that is a capacitance between the second line and the ground is at least 80 pF and at most 220 pF.

Advantageous Effects of Invention

According to an electronic control device according to the present disclosure, the occurrence of communication errors can be reduced.

BRIEF DESCRIPTION OF DRAWINGS

FIG. 6 illustrates a capacitance between the ground and differential signal wires and a cut-off frequency of an insertion loss of a differential-mode signal in the electronic control device.

DESCRIPTION OF EMBODIMENTS

[Circumstances Leading to the Present Disclosure]

First, an electronic control device according to Comparative Example 1 that uses communication by a differential transmission method is to be described.

Figure 1:
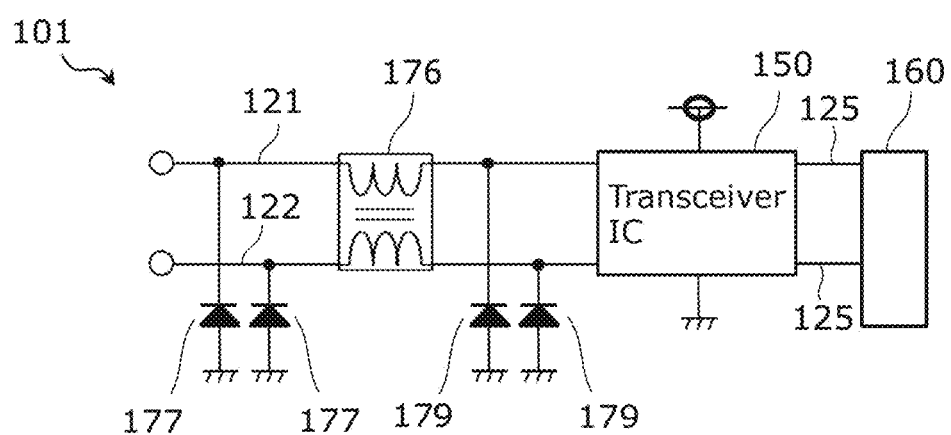
FIG. 1 is a circuit diagram illustrating an electronic control device according to Comparative Example 1.

FIG. 1 is a circuit diagram illustrating electronic control device 101 according to Comparative Example 1.

Electronic control device 101 according to Comparative Example 1 includes transceiver IC 150 that transmits and receives communication signals via first line 121 and second line 122 that are differential signal wires, zener diode 177 that protects transceiver IC 150 from a disturbance surge, common-mode choke coil 176 that attenuates common mode noise, and microprocessor 160 that transmits control signals to transceiver IC 150 through control signal wires 125. Furthermore, electronic control device 101 according to Comparative Example 1 includes zener diodes 179 that protect transceiver IC 150 when a back electromotive voltage is generated in common mode choke coil 176.

Common-mode choke coil 176 is provided in first line 121 and second line 122, passes a signal current, and attenuates a common-mode noise current. Most of the noise superimposed on differential signal wires is common-mode noise, and common-mode choke coil 176 can attenuate common-mode noise.

For example, if an external bus line connected to first line 121 is short-circuited with a battery and a voltage of first line 121 is highly increased, a back electromotive voltage is generated in common-mode choke coil 176. In electronic control device 101 according to Comparative Example 1, even when a back electromotive voltage is generated, zener diodes 179 operate, so that transceiver IC 150 can be protected. However, when a potential of first line 121 goes back to an original potential, a problem arises that reverse recovery currents flow through zener diodes 179 and communication of transceiver IC 150 is inhibited, so that a communication error occurs.

An electronic control device according to the present embodiment has a configuration as follows in order to reduce the occurrence of communication errors.

In the following, embodiments are to be specifically described with reference to the drawings.

Note that the embodiments described below each show a specific example of the present disclosure. The numerical values, shapes, materials, elements, the arrangement and connection of the elements, steps, and the processing order of the steps, for instance, indicated in the following embodiments are mere examples, and are not intended to limit the present disclosure. Out of the elements in the following embodiments, elements not recited in any of the independent claims are described as arbitrary elements.

In this Specification, a numerical range does not necessarily have only strict meanings, and also covers a substantially equivalent range that includes a difference of about several percent, for example.

The drawings are schematic diagrams to which emphasis, omission, and ratio adjustment are appropriately added in order to illustrate the present disclosure, and thus are not necessarily accurate illustrations. The drawings may show shapes, positional relations, and ratios that are different from actual shapes, actual positional relations, and actual ratios.

In the drawings, the same sign is given to substantially the same element, and redundant description may be omitted or simplified.

Embodiment 1

[Configuration of Electronic Control Device]

A configuration of an electronic control device according to Embodiment 1 is to be described with reference to FIG. 2.

Figure 2:
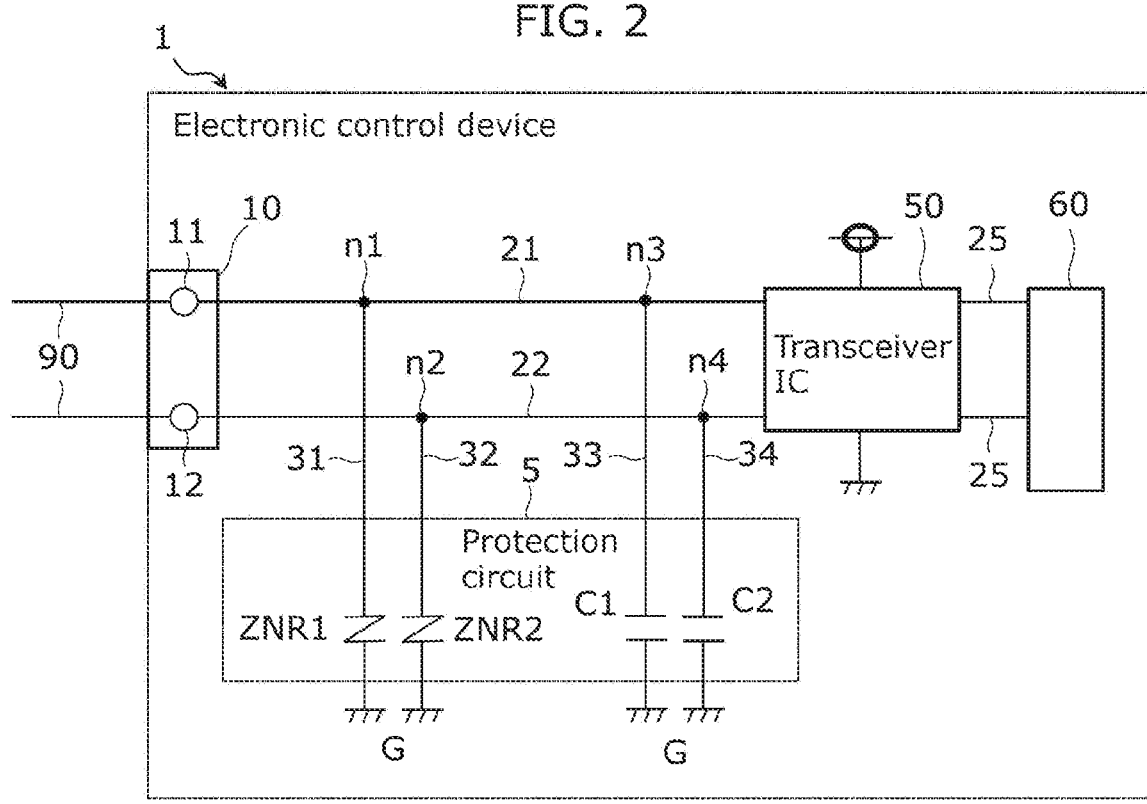
FIG. 2 is a circuit diagram illustrating an electronic control device according to Embodiment 1.

FIG. 2 is a circuit diagram illustrating electronic control device 1 according to Embodiment 1. As illustrated in FIG. 2, electronic control device 1 includes connector 10, transceiver IC 50, microprocessor 60, and protection circuit 5.

Electronic control device 1 includes first line 21 and second line 22 that are differential signal wires, and control signal wires 25. First line 21 connects first input-output terminal 11 of connector 10 and transceiver IC 50. Second line 22 connects second input-output terminal 12 of connector 10 and transceiver IC 50. Control signal wires 25 are lines that connect transceiver IC 50 and microprocessor 60.

Thus, connector 10 and transceiver IC 50 are connected to each other via first line 21 and second line 22. Transceiver IC 50 and microprocessor 60 are connected to each other via control signal wires 25.

For example, electronic control device 1 is provided in a vehicle, and communicates with other electronic control devices in the vehicle via a vehicle network. Harness 90 that includes bus lines for communication with other electronic control devices is connected to electronic control device 1. When a controller area network (CAN) is adopted as a vehicle network, shielded twisted pair (STP) cables or unshielded twisted pair (UTP) cables are used as harness 90, for example.

Microprocessor 60 executes various types of application processes according to on-vehicle devices. For example, when such on-vehicle devices are infotainment devices (such as a car navigation device and a display audio device, for example), microprocessor 60 executes image signal processing or audio signal processing.

Transceiver IC 50 converts differential signals received via harness 90 into digital signals that are to be processed by microprocessor 60. Further, transceiver IC 50 converts digital signals processed by microprocessor 60 into differential signals, and transmits the converted differential signals to other electronic control devices via harness 90.

Connector 10 includes first input-output terminal 11 and second input-output terminal 12. Harness 90 is connected to first input-output terminal 11 and second input-output terminal 12, and differential signals are input and output via first input-output terminal 11 and second input-output terminal 12. The input impedance of first input-output terminal 11 and second input-output terminal 12, or in other words, the input impedance of transceiver IC 50 is at least 12 kΩ and at most 100 kΩ, for example.

Note that a terminating resistor determined by ISO11898-2, which is not illustrated, is provided between the differential signal wires. The terminating resistor is a circuit in which two 60Ω resistors are connected in series between the differential signal wires and a capacitor of 4.7 nF to 100 nF is connected between ground G and a node to which the two 60Ω resistors are connected, and the circuit is provided between first line 21 and second line 22 that are differential signal wires or provided in harness 90.

In electronic control device 1 according to the present embodiment, a common-mode choke coil (a common-mode noise filter) is not provided between transceiver IC 50 and first input-output terminal 11 and second input-output terminal 12, but protection circuit 5 is connected therebetween. Protection circuit 5 is connected to first line 21 and second line 22.

Protection circuit 5 includes first varistor element ZNR1, second varistor element ZNR2, first capacitor element C1, and second capacitor element C2.

First varistor element ZNR1 is provided on first ground line 31 that connects first line 21 and ground G. Specifically, one terminal of first varistor element ZNR1 is connected to node n1 on first line 21 between first input-output terminal 11 and transceiver IC 50, and the other terminal of first varistor element ZNR1 is connected to ground G. Ground G has a reference potential of electronic control device 1, and can be acquired by being electrically connected to the vehicle body earth, for example.

Second varistor element ZNR2 is provided on second ground line 32 that connects second line 22 and ground G. Specifically, one terminal of second varistor element ZNR2 is connected to node n2 on second line 22 between second input-output terminal 12 and transceiver IC 50, and the other terminal of second varistor element ZNR2 is connected to ground G.

First capacitor element C1 is provided on third ground line 33 that connects first line 21 and ground G. Specifically, one terminal of first capacitor element C1 is connected to node n3 on first line 21 between first input-output terminal 11 and transceiver IC 50, and the other terminal of first capacitor element C1 is connected to ground G. Specifically, first capacitor element C1 is connected in parallel to first varistor element ZNR1. Node n3 is provided on first line 21 between node n1 and transceiver IC 50, but is not limited to be provided thereon, and may be provided on first line 21 between first input-output terminal 11 and node n1. Note that no other electronic components are connected to the line between node n1 and node n3.

Second capacitor element C2 is provided on fourth ground line 34 that connects second line 22 and ground G. Specifically, one terminal of second capacitor element C2 is connected to node n4 on second line 22 between second input-output terminal 12 and transceiver IC 50, and the other terminal of second capacitor element C2 is connected to ground G. Specifically, second capacitor element C2 is connected in parallel to second varistor element ZNR2. Node n4 is provided on second line 22 between node n2 and transceiver IC 50, but is not limited to be provided thereon, and may be provided on second line 22 between second input-output terminal 12 and node n2. Note that no other electronic components are connected to the line between node n2 and node n4.

First varistor element ZNR1 and second varistor element ZNR2 are placed in the conductive state under a predetermined voltage condition, to draw currents through nodes n1 and n2 to ground G. Accordingly, even if high currents flow through first line 21 and second line 22, the currents can be prevented from flowing into transceiver IC 50, so that transceiver IC 50 can be protected.

First capacitance CP1 that is a sum of a capacitance of first varistor element ZNR1 and a capacitance of first capacitor element C1 is at least 80 pF and at most 220 pF. Second capacitance CP2 that is a sum of a capacitance of second varistor element ZNR2 and a capacitance of second capacitor element C2 is also at least 80 pF and at most 220 pF. Thus, a capacitance between first line 21 and ground G is at least 80 pF and at most 220 pF, and a capacitance between second line 22 and ground G is also at least 80 pF and at most 220 pF.

As described above, electronic control device 1 according to the present embodiment does not include a common-mode choke coil as shown in Comparative Example 1. Accordingly, a back electromotive voltage due to a common-mode choke coil can be prevented from being generated. Thus, a communication error due to a back electromotive voltage can be prevented from being caused in electronic control device 1.

In electronic control device 1, a capacitance between first line 21 and ground G and a capacitance between second line 22 and ground G are both at least 80 pF and at most 220 pF. Accordingly, common-mode signals input to and output from electronic control device 1 can be attenuated and furthermore, distortion of rectangular waves of differential signals that are differential-mode signals can be reduced. The following describes this point.

Advantageous Effects

Advantageous effects yielded by electronic control device 1 having a configuration as above are to be described in comparison with Comparative Example 2. Here, ranges of numerical values of first capacitance CP1 and second capacitance CP2 stated above are to be described.

Figure 3:
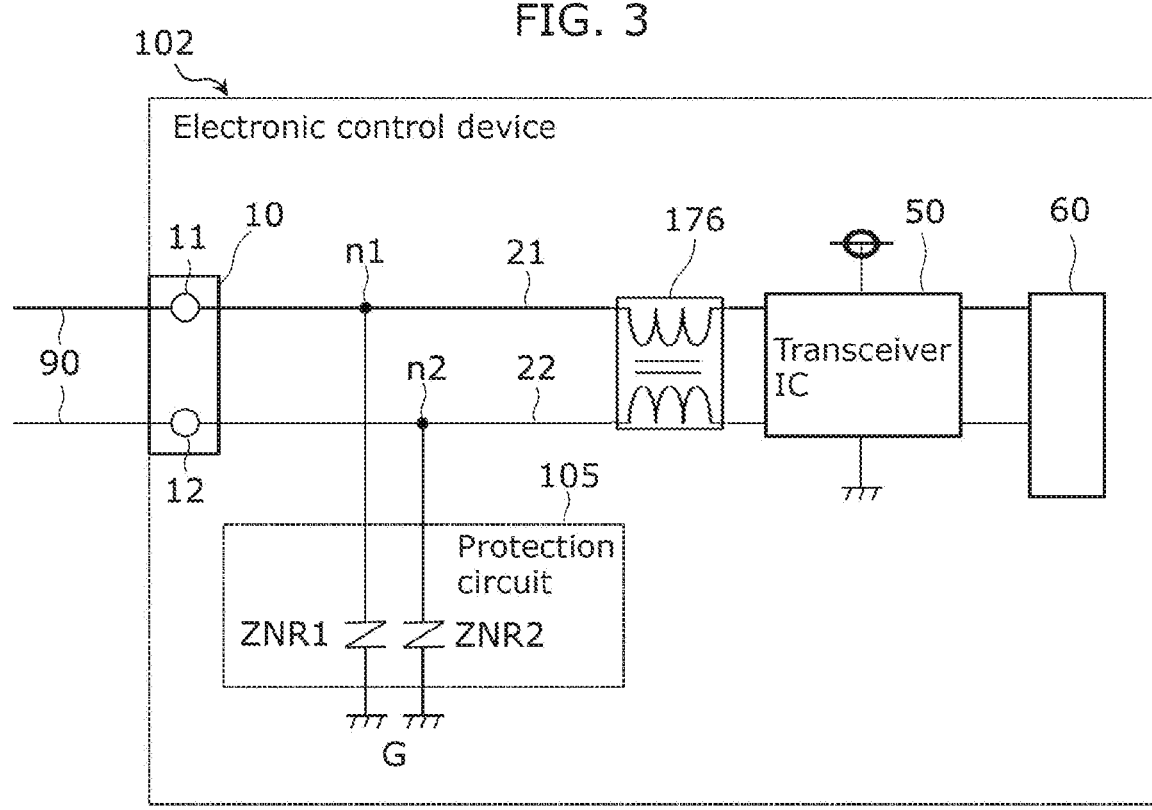
FIG. 3 is a circuit diagram illustrating an electronic control device according to Comparative Example 2.

FIG. 3 is a circuit diagram illustrating electronic control device 102 according to Comparative Example 2.

Electronic control device 102 according to Comparative Example 2 includes connector 10, transceiver IC 50, microprocessor 60, and protection circuit 105, and further includes common-mode choke coil 176.

Common-mode choke coil 176 according to Comparative Example 2 is provided in series onto lines between transceiver IC 50 and first input-output terminal 11 and second input-output terminal 12. Protection circuit 105 is connected to lines between common-mode choke coil 176 and first input-output terminal 11 and second input-output terminal 12. Protection circuit 105 includes first varistor element ZNR1 and second varistor element ZNR2. An inductance of common-mode choke coil 176 is 100 pH, for example. A product manufactured by TDK Corporation (product number: ACT1210-101-2P-TL00) was used as actual common-mode choke coil 176.

Figure 4:
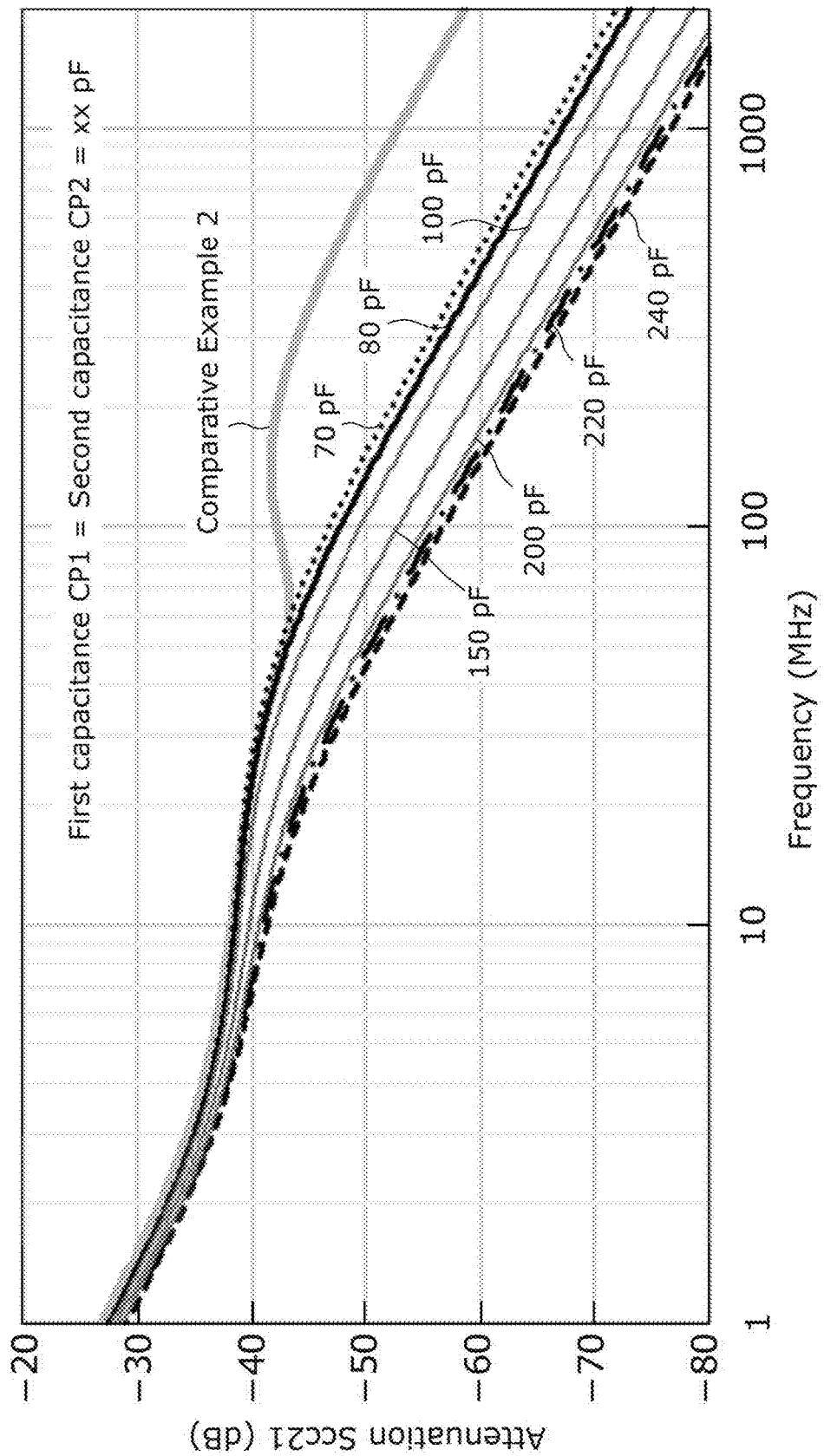
FIG. 4 illustrates passing characteristics of common-mode signals in the electronic control devices according to Embodiment 1 and Comparative Example 2.

FIG. 4 illustrates passing characteristics of common-mode signals in the electronic control devices according to Embodiment 1 and Comparative Example 2. The horizontal axis in the drawing indicates a frequency of a common-mode signal. The vertical axis in the drawing indicates attenuation Scc21 of a common-mode signal and shows that the lower a point on the vertical axis is, the greater the attenuation is.

The drawing also shows passing characteristics when first capacitance CP1 and second capacitance CP2 are changed, that is, a capacitance between ground G and each differential signal wire in electronic control device 1 is changed. First capacitance CP1 is changed by changing a capacitance of first capacitor element C1 from 55 pF to 225 pF while maintaining a capacitance of first varistor element ZNR1 at 15 pF. Second capacitance CP2 is changed by changing a capacitance of second capacitor element C2 similarly to first capacitor element C1 while maintaining a capacitance of second varistor element ZNR2 at 15 pF.

Note that the expression "xx pF" in the drawing means that "First capacitance CP1=Second capacitance CP2=xx pF" (x denotes a numerical value). The same applies to the drawings described below.

As illustrated in FIG. 4, when first capacitance CP1 and second capacitance CP2 in Embodiment 1 are both 70 pF, attenuation Scc21 is smaller than that in Comparative Example 2 at around a frequency of 50 MHz. In contrast, when first capacitance CP1 and second capacitance CP2 are both at least 80 pF, attenuation Scc21 is greater than that in Comparative Example 2 throughout the entire range illustrated in FIG. 4. Thus, in order to make attenuation Scc21 of a common-mode signal greater than that in Comparative Example 2, first capacitance CP1 and second capacitance CP2 in Embodiment 1 may be both at least 80 pF.

Figure 5:
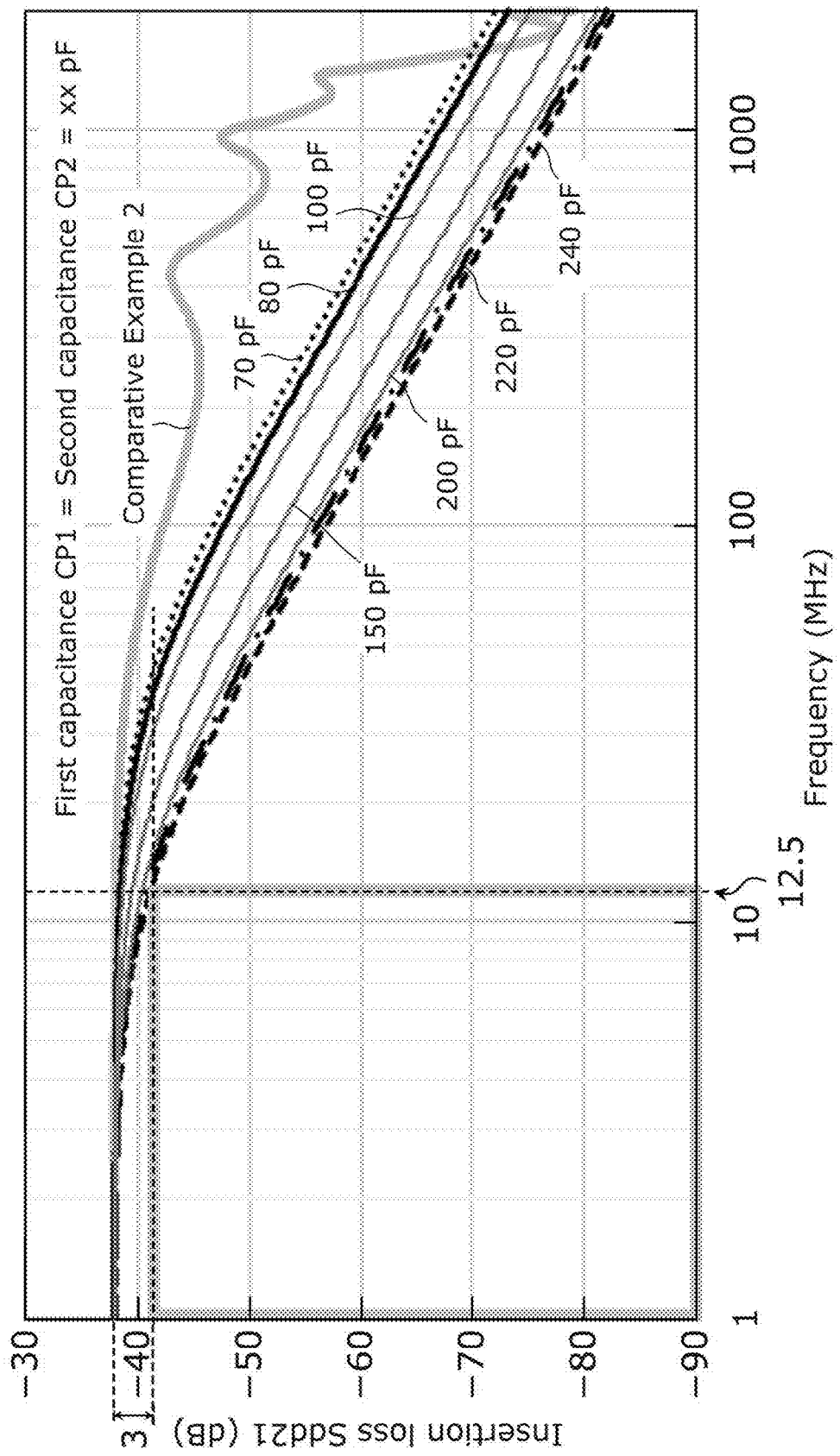
FIG. 5 illustrates passing characteristics of differential-mode signals in the electronic control devices according to Embodiment 1 and Comparative Example 2.

FIG. 5 illustrates passing characteristics of differential-mode signals in the electronic control devices according to Embodiment 1 and Comparative Example 2. The horizontal axis in the drawing indicates a frequency of a differential-mode signal. The vertical axis in the drawing indicates insertion loss Sdd21 of a differential-mode signal, and shows that the lower a point on the vertical axis is, the greater the loss is. The drawing also shows passing characteristics when first capacitance CP1 and second capacitance CP2 are changed in electronic control device 1. The way to change capacitances is as stated in the example illustrated in FIG. 4.

As illustrated in FIG. 5, when first capacitance CP1 and second capacitance CP2 in Embodiment 1 are both 240 pF, loss of 3 dB or more is generated at a frequency of 12.5 MHz. In contrast, when first capacitance CP1 and second capacitance CP2 are both at most 220 pF, loss of 3 dB or more is not generated at a frequency of 12.5 MHz. Note that a frequency of 12.5 MHz is an upper limit of a frequency necessary to assuredly transmit and receive differential-mode signals and here, is set to a value 5 times greater than a frequency of 2.5 MHz that is used when communication is performed at a communication speed of 5 Mbps based on the CAN with Flexible Data Rate (CAN FD) communication, for example.

FIG. 6 illustrates a capacitance between ground G and differential signal wires and cut-off frequency fc of insertion loss Sdd21 of a differential-mode signal in electronic control device 1. Cut-off frequency fc is a frequency when a loss of 3 dB is generated.

As illustrated in FIG. 6, when first capacitance CP1 and second capacitance CP2 in Embodiment 1 are both 240 pF or 230 pF, cut-off frequency fc is at most 12.5 MHz that is set as stated above. In contrast, when first capacitance CP1 and second capacitance CP2 are both at most 220 pF, cut-off frequency fc is higher than 12.5 MHz. Thus, in order to make cut-off frequency fc higher than 12.5 MHz, first capacitance CP1 and second capacitance CP2 in Embodiment 1 may be at most 220 pF.

Thus, from the results in FIG. 4 and FIG. 6, first capacitance CP1 and second capacitance CP2 in Embodiment 1 may be both at least 80 pF to at most 220 pF. In this manner, even if electronic control device 1 does not include a common-mode choke coil, a common-mode signal can be attenuated and furthermore, distortion of rectangular waves of a differential signal that is a differential-mode signal can be reduced.

Next, another example of a configuration of electronic control device 1 is to be described in comparison with Comparative Example 2. Here, a difference between first capacitance CP1 and second capacitance CP2 is to be described.

Figure 7:
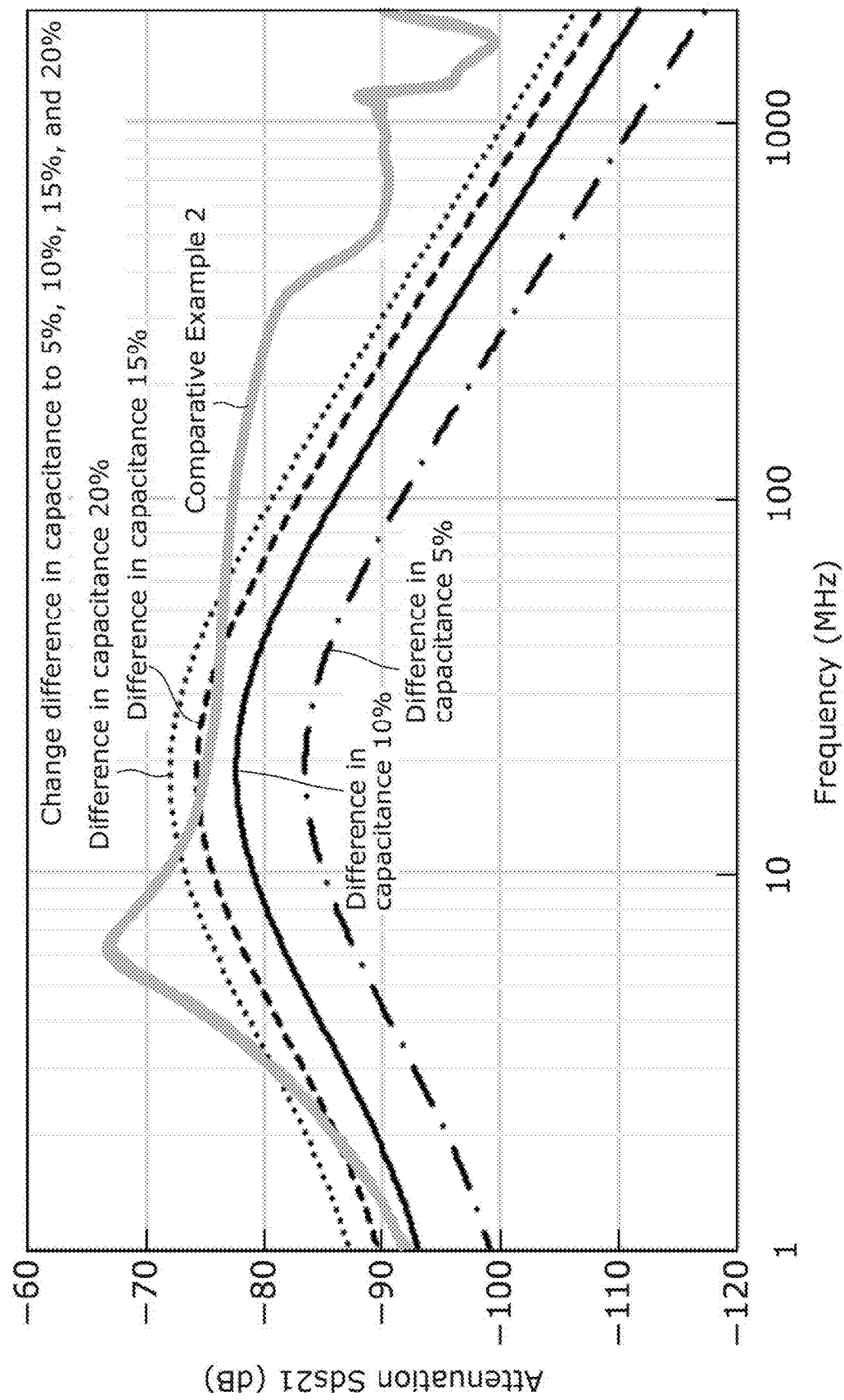
FIG. 7 illustrates passing characteristics of common-differential mode converted signals in the electronic control devices according to Embodiment 1 and Comparative Example 2.

FIG. 7 illustrates passing characteristics of common-differential mode converted signals in the electronic control devices according to Embodiment 1 and Comparative Example 2. The horizontal axis in the drawing indicates a frequency of a common-differential mode converted signal. The vertical axis in the drawing indicates attenuation Sds21 of a common-differential mode converted signal, and shows that the lower a point on the vertical axis is, the greater the attenuation is.

The drawing also shows passing characteristics when a difference between first capacitance CP1 and second capacitance CP2 are changed in electronic control device 1. A difference between first capacitance CP1 and second capacitance CP2 is changed by fixing first capacitance CP1 to 220 pF and changing second capacitance CP2, for example. A difference in capacitance is a value obtained by the expression "a difference in capacitance (%)=((first capacitance CP1−second capacitance CP2/first capacitance CP1)×100". In this example, first capacitance CP1>second capacitance CP2.

As illustrated in FIG. 7, if a difference in capacitance is 20% or 15%, attenuation Sds21 is smaller than that in Comparative Example 2 at a frequency of 1 MHz to 3 MHz and at a frequency of 10 MHz to 60 MHz. In contrast, if a difference in capacitance is at most 10%, attenuation Sds21 is greater than that in Comparative Example 2 in the entire range. Thus, in order to make attenuation Sds21 of a common-differential mode converted signal greater than the attenuation in Comparative Example 2, a difference between first capacitance CP1 and second capacitance CP2 in Embodiment 1 may be at most 10%.

Figure 8:
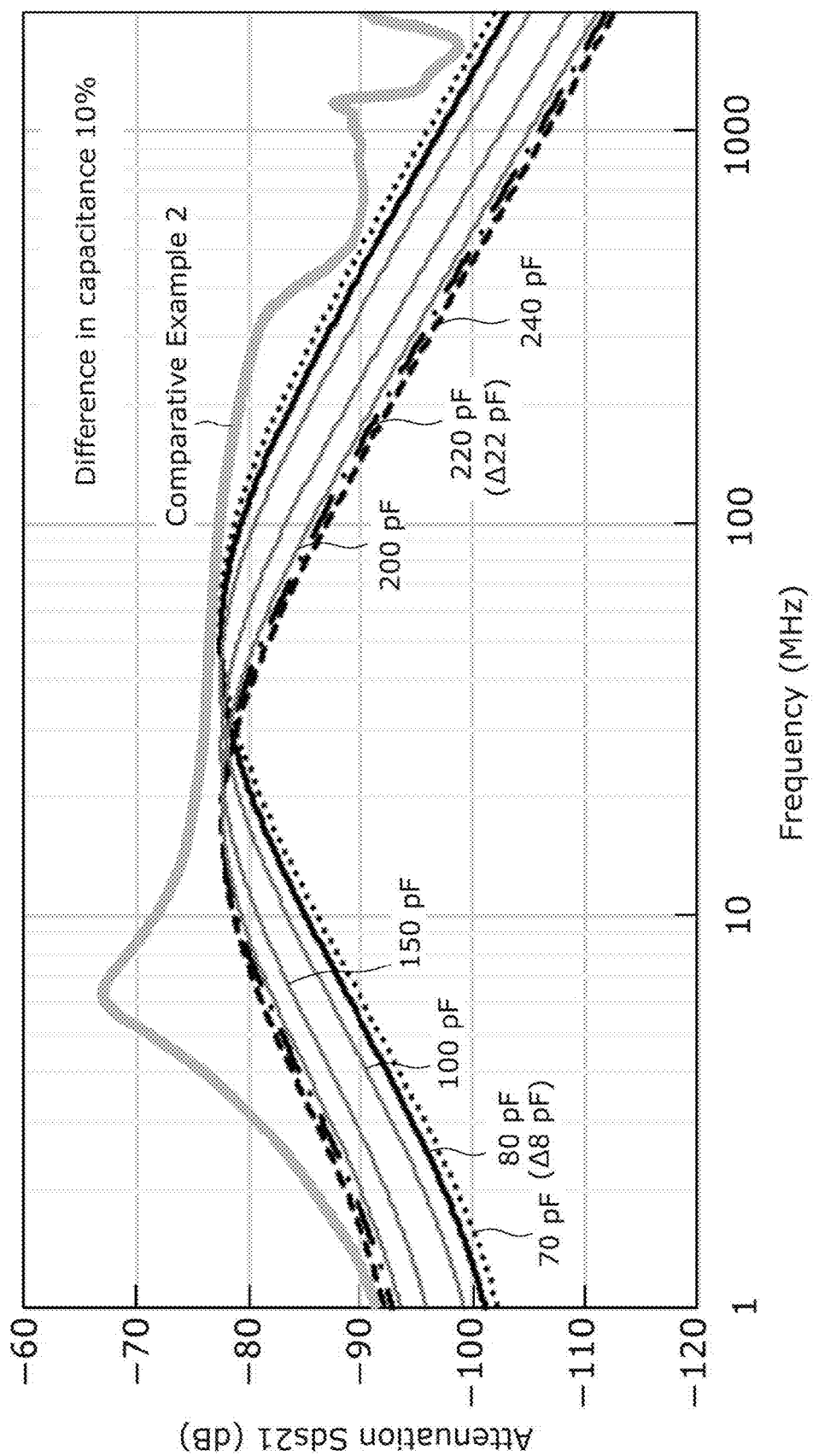
FIG. 8 illustrates other examples of passing characteristics of common-differential mode converted signals in the electronic control devices according to Embodiment 1 and Comparative Example 2.

FIG. 8 illustrates other examples of passing characteristics of common-differential mode converted signals in the electronic control devices according to Embodiment 1 and Comparative Example 2.

The drawing also shows passing characteristics when a difference between first capacitance CP1 and second capacitance CP2 are changed in electronic control device 1. A difference between first capacitance CP1 and second capacitance CP2 is changed by changing first capacitance CP1 from 70 pF to 240 pF in order to make the difference 10% of first capacitance CP1.

For example, when first capacitance CP1 is 80 pF, a difference between first capacitance CP1 and second capacitance CP2 is Δ8 pF. For example, when first capacitance CP1 is 220 pF, a difference between first capacitance CP1 and second capacitance CP2 is Δ22 pF. Note that also in this example, first capacitance CP1>second capacitance CP2.

As illustrated in FIG. 8, when a difference in capacitance value is 10%, attenuation Sds21 when first capacitance CP1 and second capacitance CP2 in Embodiment 1 are at least 70 pF to at most 240 pF is greater than the attenuation in Comparative Example 2 in the entire range. Thus, by setting first capacitance CP1 and second capacitance CP2 in Embodiment 1 described above to at least 80 pF to at most 220 pF and setting a difference between first capacitance CP1 and second capacitance CP2 to 10%, attenuation Sds21 of a common-differential mode converted signal can be made greater than the attenuation in Comparative Example 2.

Specifications for evaluating noise immunity of vehicle electronic devices include a Bulk Current Injection (BCI) testing method. This testing method is for assessing immunity (electromagnetic susceptibility) of electronic devices by injecting radio-frequency disturbance current into a harness using a current injecting probe (a BCI probe), and conditions of the method are determined by automobile manufacturers and ISO11452-4. ISO11452-4 determines injection of disturbance current in a frequency range of 1 MHz to 400 MHz as a testing condition.

That is a test for checking a malfunction and a problem of an electronic device caused when a harness of the electronic device is excited by an electromagnetic field radiated by another electronic device such as a wireless device and strong magnetic field noise is induced in the harness. Since current noise/voltage noise having a high amplitude in the common mode is injected into a twisted-pair cable used as a harness of electronic control device 1, a varistor element provided in electronic control device 1 may attenuate common-mode noise and furthermore, may further greatly reduce a common-differential mode conversion amount.

As described above, by decreasing a difference in capacitance, a common-mode noise signal input to electronic control device 1 due to, for example, induction of strong magnetic field noise can be prevented from being converted into a differential-mode nose signal by a varistor element. Thus, a communication error can be prevented from being caused in electronic control device 1.

Variation 1 of Embodiment 1

Electronic control device 1A according to Variation 1 of Embodiment 1 is to be described. In Variation 1, an example in which protection circuit 5A includes varistor elements only is to be described.

Figure 9:
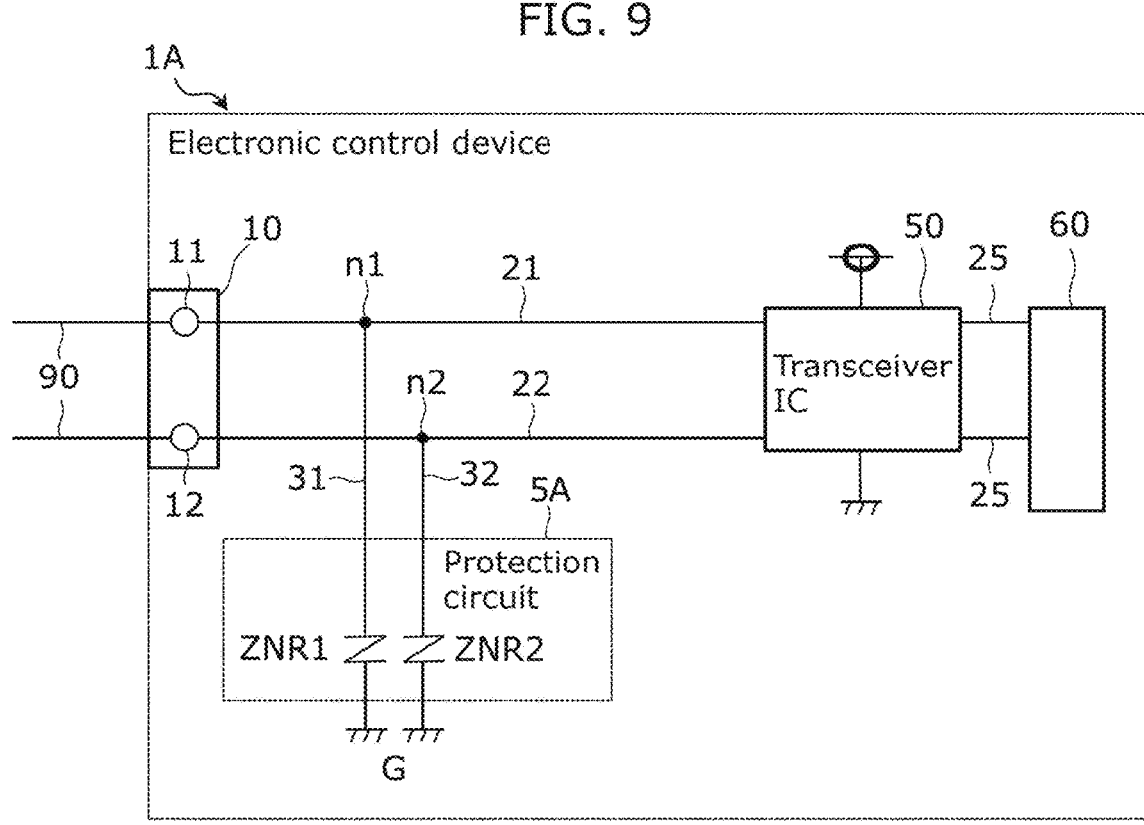
FIG. 9 illustrates an electronic control device according to Variation 1 of Embodiment 1.

FIG. 9 is a circuit diagram illustrating electronic control device 1A according to Variation 1 of Embodiment 1. Electronic control device 1A according to Variation 1 includes connector 10, transceiver IC 50, microprocessor 60, and protection circuit 5A.

In electronic control device 1A, a common-mode choke coil is not provided between lines that connect transceiver IC 50 and first input-output terminal 11 and second input-output terminal 12, but protection circuit 5A is connected therebetween. Protection circuit 5A includes first varistor element ZNR1 and second varistor element ZNR2.

First varistor element ZNR1 is provided on first ground line 31 that connects first line 21 and ground G. Second varistor element ZNR2 is provided on second ground line 32 that connects second line 22 and ground G.

First capacitance CP1 that is a capacitance of first varistor element ZNR1 is at least 80 pF and at most 220 pF. Second capacitance CP2 that is a capacitance of second varistor element ZNR2 is also at least 80 pF and at most 220 pF. Thus, a capacitance between first line 21 and ground G is at least 80 pF and at most 220 pF, and a capacitance between second line 22 and ground G is also at least 80 pF and at most 220 pF.

Also, electronic control device 1A according to Variation 1 does not include a common-mode choke coil as shown in Comparative Example 2. Accordingly, a back electromotive voltage due to a common-mode choke coil can be prevented from being generated. Thus, a communication error due to a back electromotive voltage can be prevented from being caused in electronic control device 1A.

In electronic control device 1A, a capacitance between first line 21 and ground G and a capacitance between second line 22 and ground G are both at least 80 pF and at most 220 pF. Accordingly, common-mode signals input to and output from electronic control device 1A can be attenuated and furthermore, distortion of rectangular waves of differential signals that are differential-mode signals can be reduced.

Variation 2 of Embodiment 1

Electronic control device 1B according to Variation 2 of Embodiment 1 is to be described. In Variation 2, an example in which two varistor elements of protection circuit 5B are provided in a single multilayer-varistor component is to be described.

Figure 10:
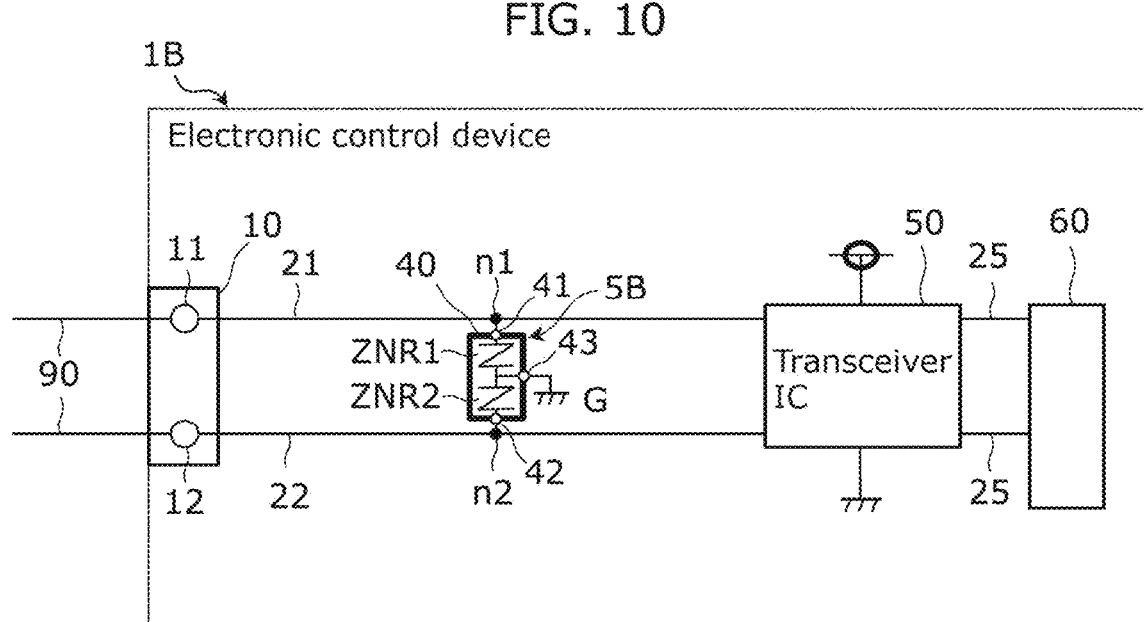
FIG. 10 illustrates an electronic control device according to Variation 2 of Embodiment 1.

FIG. 10 is a circuit diagram illustrating electronic control device 1B according to Variation 2 of Embodiment 1. Electronic control device 1B according to Variation 2 includes connector 10, transceiver IC 50, microprocessor 60, and protection circuit 5B.

In electronic control device 1B, a common-mode choke coil is not provided between lines that connect transceiver IC 50 and first input-output terminal 11 and second input-output terminal 12, but protection circuit 5B is connected therebetween. Protection circuit 5B includes multilayer-varistor component 40 in which first varistor element ZNR1 and second varistor element ZNR2 are provided.

Multilayer-varistor component 40 includes first signal terminal 41 that is one terminal of first varistor element ZNR1, second signal terminal 42 that is one terminal of second varistor element ZNR2, and ground terminal 43 that is a common terminal that serves as both the other terminal of first varistor element ZNR1 and the other terminal of second varistor element ZNR2.

First signal terminal 41 is connected to node n1 on first line 21, and second signal terminal 42 is connected to node n2 on second line 22. Ground terminal 43 is a common terminal that serves as both the other terminal of first varistor element ZNR1 and the other terminal of second varistor element ZNR2, and is connected to ground G. Since one common terminal serves as both the other terminal of first varistor element ZNR1 and the other terminal of second varistor element ZNR2, a difference in capacitance between first varistor element ZNR1 and second varistor element ZNR2 can be decreased.

Multilayer-varistor component 40 is obtained by stacking ceramic layers and ceramic layers each with one or more internal electrodes and thereafter providing an external terminal. The internal electrodes are precisely provided on the ceramic layer by printing processes, for instance, and the ceramic layer with the internal electrodes is given a substantially uniform thickness in the component, and thus a difference in capacitance between first varistor element ZNR1 and second varistor element ZNR2 can be decreased down to 5% or less, for example.

Also, electronic control device 1B according to Variation 2 does not include a common-mode choke coil as shown in Comparative Example 2. Accordingly, a back electromotive voltage due to a common-mode choke coil can be prevented from being generated. Thus, a communication error due to a back electromotive voltage can be prevented from being caused in electronic control device 1B.

In electronic control device 1B, a difference in capacitance between first varistor element ZNR1 and second varistor element ZNR2 can be decreased. Accordingly, a difference between a capacitance between first line 21 and ground G and a capacitance between second line 22 and ground G can be decreased. Accordingly, a common-mode noise signal input to electronic control device 1B due to, for example, induction of strong magnetic field noise can be prevented from being converted into a differential-mode nose signal by a varistor element. Thus, a communication error can be prevented from being caused in electronic control device 1B.

Summary of Embodiment 1

Electronic control device 1 according to the present embodiment includes: first input-output terminal 11 and second input-output terminal 12 through which differential signals are input and output; transceiver integrated circuit (IC) 50 that transmits and receives the differential signals;

first line 21 that connects first input-output terminal 11 and transceiver IC 50; and second line 22 that connects second input-output terminal 12 and transceiver IC 50. First capacitance CP1 that is a capacitance between first line 21 and ground G is at least 80 pF and at most 220 pF, and second capacitance CP2 that is a capacitance between second line 22 and ground G is at least 80 pF and at most 220 pF.

In this manner, by setting each of first capacitance CP1 and second capacitance CP2 to at least 80 pF and at most 220 pF, common-mode signals input to and output from electronic control device 1 can be attenuated and furthermore, distortion of rectangular waves of differential signals that are differential-mode signals can be reduced. Accordingly, it is unnecessary to provide electronic control device 1 with a common-mode choke coil, so that a back electromotive voltage due to a common-mode choke coil can be prevented from being generated. Thus, a communication error can be prevented from being caused in electronic control device 1. Furthermore, a common-mode choke coil is not provided, and thus the size of electronic control device 1 can be reduced.

Electronic control device 1 may include: first varistor element ZNR1 provided on first ground line 31 that connects first line 21 and ground G; second varistor element ZNR2 provided on second ground line 32 that connects second line 22 and ground G; first capacitor element C1 connected in parallel to first varistor element ZNR1; and second capacitor element C2 connected in parallel to second varistor element ZNR2. First capacitance CP1 may be a sum of a capacitance of first varistor element ZNR1 and a capacitance of first capacitor element C1, and second capacitance CP2 may be a sum of a capacitance of second varistor element ZNR2 and a capacitance of second capacitor element C2.

In this manner, since electronic control device 1 includes first varistor element ZNR1 and second varistor element ZNR2, even if high currents flow through first line 21 and second line 22, for example, the currents can be prevented from flowing into transceiver IC 50. Accordingly, transceiver IC 50 can be protected, and a communication error can be prevented from being caused. Even if strong magnetic field noise is induced at harnesses 90 connected to first input-output terminal 11 and second input-output terminal 12 and current/voltage noise having a great amplitude is input to electronic control device 1, first varistor element ZNR1 and second varistor element ZNR2 do not generate a reverse recovery current as a zener diode shown in Comparative Example 1 does, and thus a communication error can be prevented from being caused.

Electronic control device 1A may further include: first varistor element ZNR1 provided on first ground line 31 that connects first line 21 and ground G; and second varistor element ZNR2 provided on second ground line 32 that connects second line 22 and ground G. First capacitance CP1 may be a capacitance of first varistor element ZNR1, and second capacitance CP2 may be a capacitance of second varistor element ZNR2.

In this manner, since electronic control device 1A includes first varistor element ZNR1 and second varistor element ZNR2, even if high currents flow through first line 21 and second line 22, for example, the currents can be prevented from flowing into transceiver IC 50. Accordingly, transceiver IC 50 can be protected, and a communication error can be prevented from being caused. Even if strong magnetic field noise is induced at harnesses 90 connected to first input-output terminal 11 and second input-output terminal 12 and current/voltage noise having a great amplitude is input to electronic control device 1, first varistor element ZNR1 and second varistor element ZNR2 do not generate a reverse recovery current as a zener diode shown in Comparative Example 1 does, and thus a communication error can be prevented from being caused. Furthermore, a capacitor element is not provided, and thus the size of electronic control device 1 can be reduced.

First varistor element ZNR1 and second varistor element ZNR2 may be provided in single multilayer-varistor component 40.

Accordingly, a difference in capacitance between first varistor element ZNR1 and second varistor element ZNR2 can be decreased. Accordingly, a difference between a capacitance between first line 21 and ground G and a capacitance between second line 22 and ground G can be decreased. Consequently, common-mode noise signals input to electronic control device 1B can be prevented from being converted into differential-mode noise signals in first varistor element ZNR1 and second varistor element ZNR2. Thus, a communication error can be prevented from being caused in electronic control device 1B.

Single multilayer-varistor component 40 may include: first signal terminal 41 connected to first line 21, first signal terminal 41 being one terminal of first varistor element ZNR1; second signal terminal 42 connected to second line 22, second signal terminal 42 being one terminal of second varistor element ZNR2; and ground terminal 43 connected to ground G, ground terminal 43 being a common terminal that serves as both another terminal of first varistor element ZNR1 and another terminal of second varistor element ZNR2.

Accordingly, first varistor element ZNR1 and second varistor element ZNR2 are allowed to have the same ground potential and a difference in capacitance between first varistor element ZNR1 and second varistor element ZNR2 can be decreased. Accordingly, a difference between a capacitance between first line 21 and ground G and a capacitance between second line 22 and ground G can be decreased. Consequently, common-mode noise signals input to electronic control device 1B can be prevented from being converted into differential-mode noise signals in first varistor element ZNR1 and second varistor element ZNR2. Thus, a communication error can be prevented from being caused in electronic control device 1B.

A difference between first capacitance CP1 and second capacitance CP2 may be at most 10%.

Consequently, this can decrease the amount of common-mode noise signals input to electronic control device 1 being converted into differential-mode noise signals in first varistor element ZNR1 and second varistor element ZNR2. Thus, a communication error can be prevented from being caused in electronic control device 1.

No common-mode noise filter is provided between first input-output terminal 11 and transceiver IC 50, and no common-mode noise filter is provided between second input-output terminal 12 and transceiver IC 50.

This configuration can prevent a back electromotive voltage due to a common-mode choke coil from being generated. Thus, a communication error can be prevented from being caused in electronic control device 1. Furthermore, a common-mode choke coil is not provided, and thus the size of electronic control device 1 can be reduced.

Embodiment 2

[Configuration of Electronic Control Device]

A configuration of electronic control device 1C according to Embodiment 2 is to be described with reference to FIG.

Figure 13:
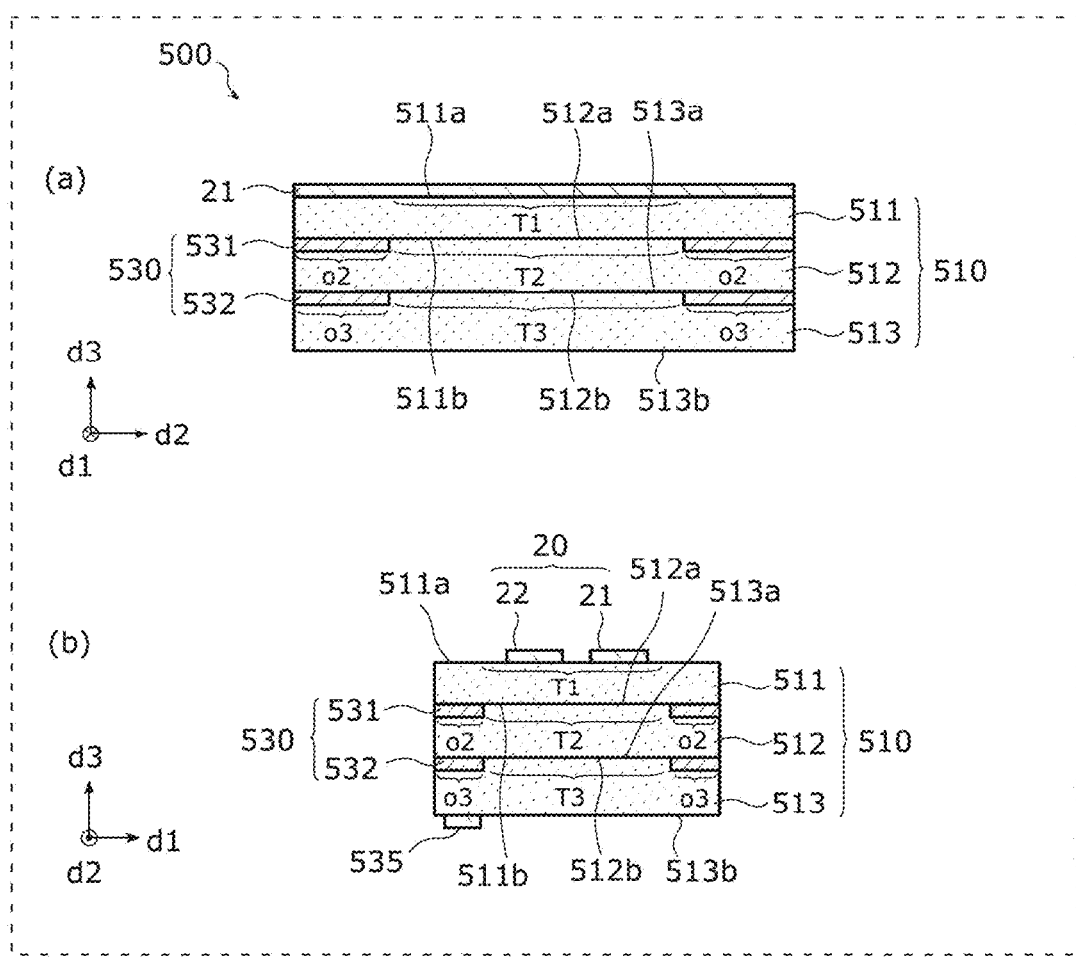
FIG. 13 illustrates cross sectional views each illustrating a portion of the multilayer substrate of the electronic control device according to Embodiment 2.

11 to FIG. 13. In Embodiment 2, an example in which a region that prevents common-mode noise signals from passing is provided in a portion of multilayer substrate 500 included in electronic control device 1C.

Figure 11:
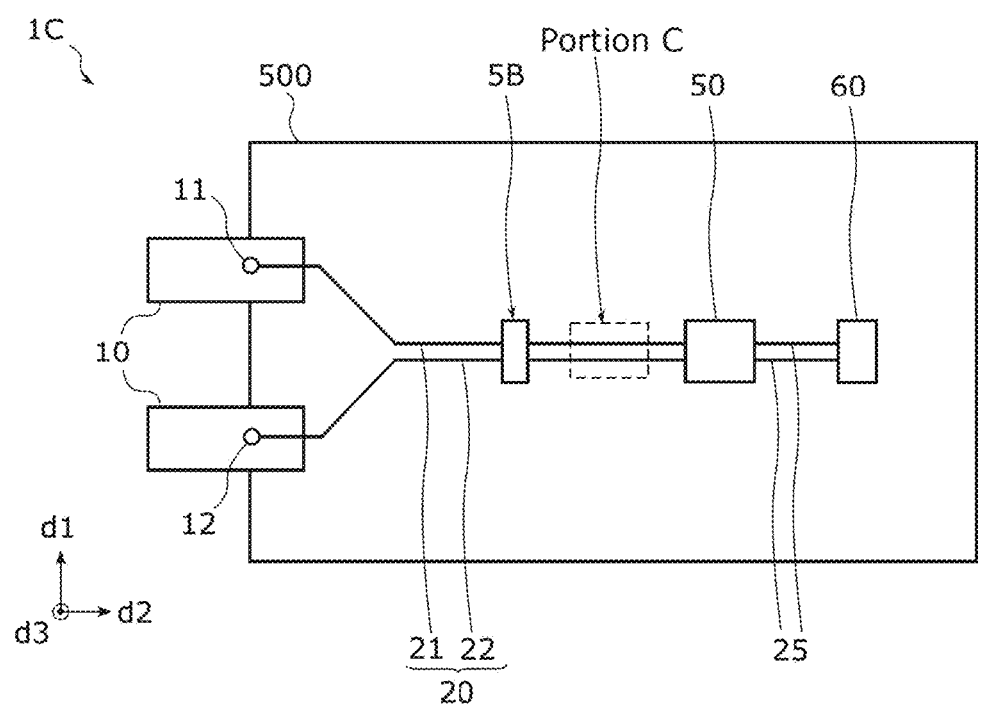
FIG. 11 is a plan view illustrating an electronic control device according to Embodiment 2.

FIG. 11 is a plan view illustrating electronic control device 1C according to Embodiment 2. Note that in FIG. 11, signal wires are represented by line segments.

As illustrated in FIG. 11, electronic control device 1C includes connectors 10, transceiver IC 50, microprocessor 60, and protection circuit 5B (refer to FIG. 10). Electronic control device 1C includes first line 21 and second line 22 that are differential signal wires 20, and control signal wires 25. First line 21 connects first input-output terminal 11 of connector 10 and transceiver IC 50. Second line 22 connects second input-output terminal 12 of connector 10 and transceiver IC 50. Control signal wires 25 connect transceiver IC 50 and microprocessor 60.

Electronic control device 1C includes multilayer substrate 500. Differential signal wires 20 are provided above multilayer substrate 500. Connectors 10, transceiver IC 50, microprocessor 60, and protection circuit 5B are mounted above multilayer substrate 500. The protection circuit may be protection circuit 5A illustrated in FIG. 9 or may be protection circuit 5 illustrated in FIG. 2.

Figure 12:
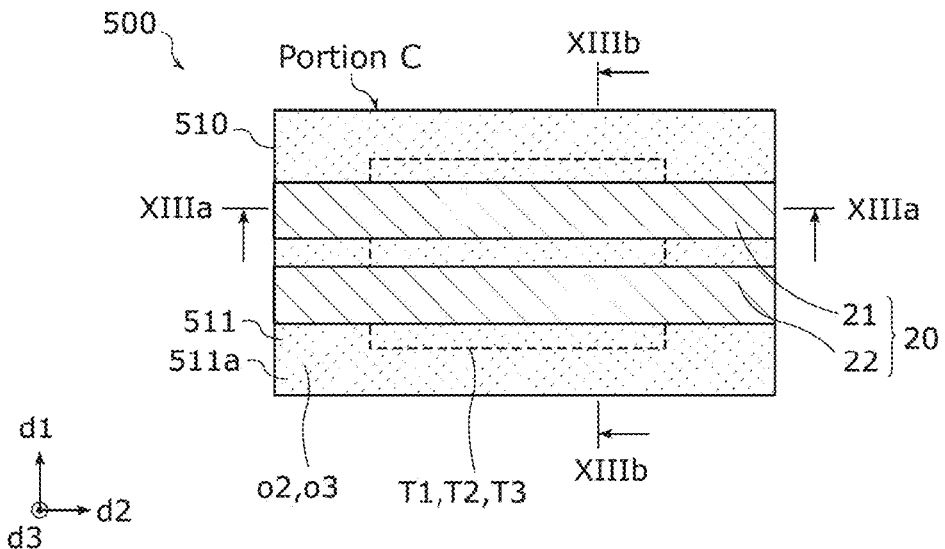
FIG. 12 is a plan view illustrating a portion of a multilayer substrate of the electronic control device according to Embodiment 2.

FIG. 12 is a plan view illustrating a portion of multilayer substrate 500 of electronic control device 1C. FIG. 13 illustrates cross sectional views each illustrating a portion of multilayer substrate 500 of electronic control device 1C. FIG. 12 illustrates portion C that is a portion of multilayer substrate 500 illustrated in FIG. 11. Part (a) of FIG. 13 illustrates a cross section of multilayer substrate 500 viewed along line XIIIa-XIIIa illustrated in FIG. 12, whereas (b) of FIG. 13 illustrates a cross section of multilayer substrate 500 viewed along line XIIIb-XIIIb illustrated in FIG. 12.

Multilayer substrate 500 illustrated in FIG. 12 and FIG. 13 has a stack structure in which dielectric layers 510 and conductor layers 530 are stacked. First line 21 and second line 22 that are differential signal wires 20 are provided on multilayer substrate 500. Although FIG. 13 illustrates an example in which multilayer substrate 500 includes three dielectric layers 510 and two conductor layers 530, the present embodiment is not limited to the example, and multilayer substrate 500 may include four or more dielectric layers 510 and three or more conductor layers 530. Another wiring layer 535 different from first line 21 and second line 22 may be provided in multilayer substrate 500.

Here, a line width direction of first line 21 and second line 22 is first direction d1, a direction in which first line 21 and second line 22 extend is second direction d2, and a direction perpendicular to both first direction d1 and second direction d2 is third direction d3. Third direction d3 is a direction perpendicular to multilayer substrate 500.

Dielectric layers 510 include dielectric material. As illustrated in FIG. 13, dielectric layers 510 include dielectric layer 511 that is the uppermost layer of multilayer substrate 500, dielectric layer 512 that is a middle layer, and dielectric layer 513 that is the lowermost layer. Note that multilayer substrate 500 may include one or more other dielectric layers different from dielectric layers 511 to 513. The number of layers of multilayer substrate 500 is not limited to three, but may be four or more.

Conductor layers 530 include conductive material such as metal. Conductor layers 530 are electrodes that are planar pattern shaped, for example. As illustrated in FIG. 13, conductor layers 530 include conductor layer 531 disposed between dielectric layers 511 and 512, and conductor layer 532 disposed between dielectric layers 512 and 513. Out of conductor layers 530, conductor layer 531 is the closet to differential signal wires 20, and conductor layer 532 is the second closet to differential signal wires 20.

Conductor layer 531 is a ground conductor layer set to the ground potential. Conductor layer 531 is connected to another terminal of first varistor element ZNR1 and another terminal of second varistor element ZNR2 through via conductors (illustration thereof is omitted) provided in dielectric layer 510, for example. Conductor layer 532 is a power supply conductor layer through which power is supplied to transceiver IC 50 and microprocessor 60. Conductor layer 532 is connected to transceiver IC 50 and microprocessor 60 through other via conductors (illustration thereof is omitted) provided in dielectric layer 510, for example.

Here, in views from principal surfaces of dielectric layers 510 on both sides, principal surfaces thereof closer to differential signal wires 20 are referred to as one-side principal surfaces of dielectric layers 510, whereas principal surfaces thereof on the opposite side from differential signal wires 20 are referred to as another-side principal surfaces of dielectric layers 510. Conductor layer 531 described above is provided in a portion of another-side principal surface 511b of dielectric layer 511 and a portion of one-side principal surface 512a of dielectric layer 512. Conductor layer 532 is provided in a portion of another-side principal surface 512b of dielectric layer 512 and a portion of one-side principal surface 513a of dielectric layer 513.

Multilayer substrate 500 in the present embodiment includes regions T2 and T3 in which conductor layers 530 are not provided, directly under partial region T1 of differential signal wires 20. A region directly under differential signal wires 20 refers to a range at least from one-side principal surface 511a of dielectric layer 511 to one-side principal surface 512a of dielectric layer 512. Note that the region directly under differential signal wires 20 may include a range from one-side principal surface 512a of dielectric layer 512 to one-side principal surface 513a of dielectric layer 513.

Partial region T1 of differential signal wires 20 described above is located on the input side of transceiver IC 50, that is, on paths that connect connectors 10 to transceiver IC 50. Specifically, partial region T1 of differential signal wires 20 is provided between transceiver IC 50 and node n1 (refer to FIG. 10) on first line 21 connected to one end of first varistor element ZNR1 and between transceiver IC 50 and node n2 on second line 22 connected to one end of second varistor element ZNR2. Note that in partial region T1 of differential signal wires 20, first line 21 and second line 22 are provided parallel to each other.

Regions T2 and T3 in which conductor layers 530 are not provided are provided by etching, for example. Regions T2 and T3 in which conductor layers 530 are not provided are in rectangular shape when viewed in third direction d3. The widths of regions T2 and T3 in first direction d1 each at least cover a width of first line 21, a width of second line 22, and a space (gap) between first line 21 and second line 22. The lengths of regions T2 and T3 in second direction d2 are predetermined by a band that prevents radio frequency signals from passing through. The lengths of regions T2 and T3 are at least half and at most twice the widths of regions T2 and T3, for example. When viewed in third direction d3, regions T2 and T3 in which conductor layers 530 are not provided overlap partial region T1 of differential signal wires 20.

Within other-side principal surface 511b of dielectric layer 511, conductor layer 531 is not provided in region T2 corresponding to region T1, but is provided in perimeter region o2 surrounding the perimeter of region T2. Dielectric layer 512 is provided in region T2. Note that a portion of dielectric layer 512 and a portion of dielectric layer 511 may be embedded in region T2.

Within other-side principal surface 512b of dielectric layer 512, conductor layer 532 is not provided in region T3 corresponding to region T1, but is provided in perimeter region o3 surrounding the perimeter of region T3. Dielectric layer 513 different from dielectric layer 512 is provided in region T3. Note that a portion of dielectric layer 513 and a portion of dielectric layer 512 may be embedded in region T3.

As described above, multilayer substrate 500 in the present embodiment includes regions T2 and T3 in which conductor layers 530 are not provided, directly under partial region T1 of differential signal wires 20. With this configuration, in partial region T1 of differential signal wires 20, common-mode impedance can be increased, and common-mode noise signals can be prevented from passing through. In the following, advantageous effects yielded by multilayer substrate 500 having a configuration as above are to be described.

Advantageous Effects

Advantageous effects yielded by multilayer substrate 500 included in electronic control device 1C according to Embodiment 2 are to be described by comparing Example that is an example of Embodiment 2 with Comparative Example 3.

Figure 14:
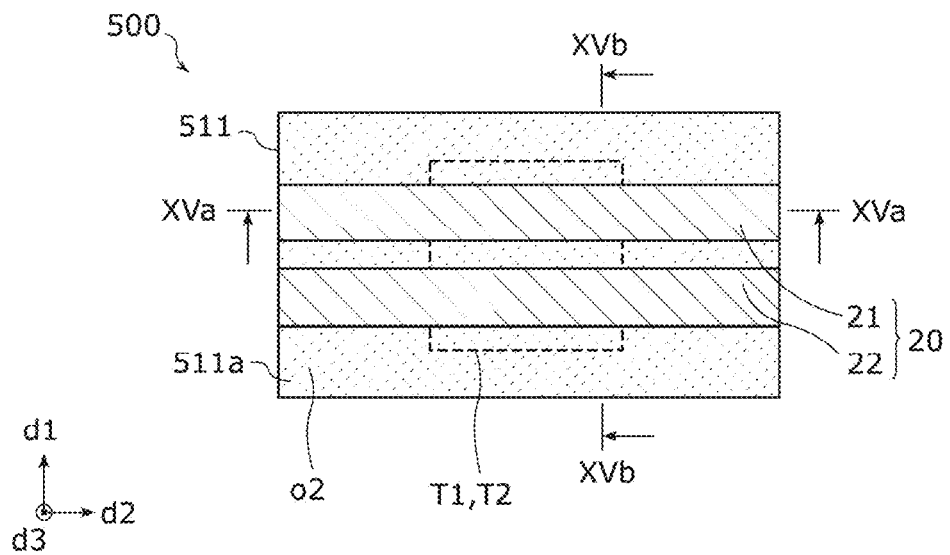
FIG. 14 is a plan view illustrating a multilayer substrate in Example that is an example of Embodiment 2.
Figure 15:
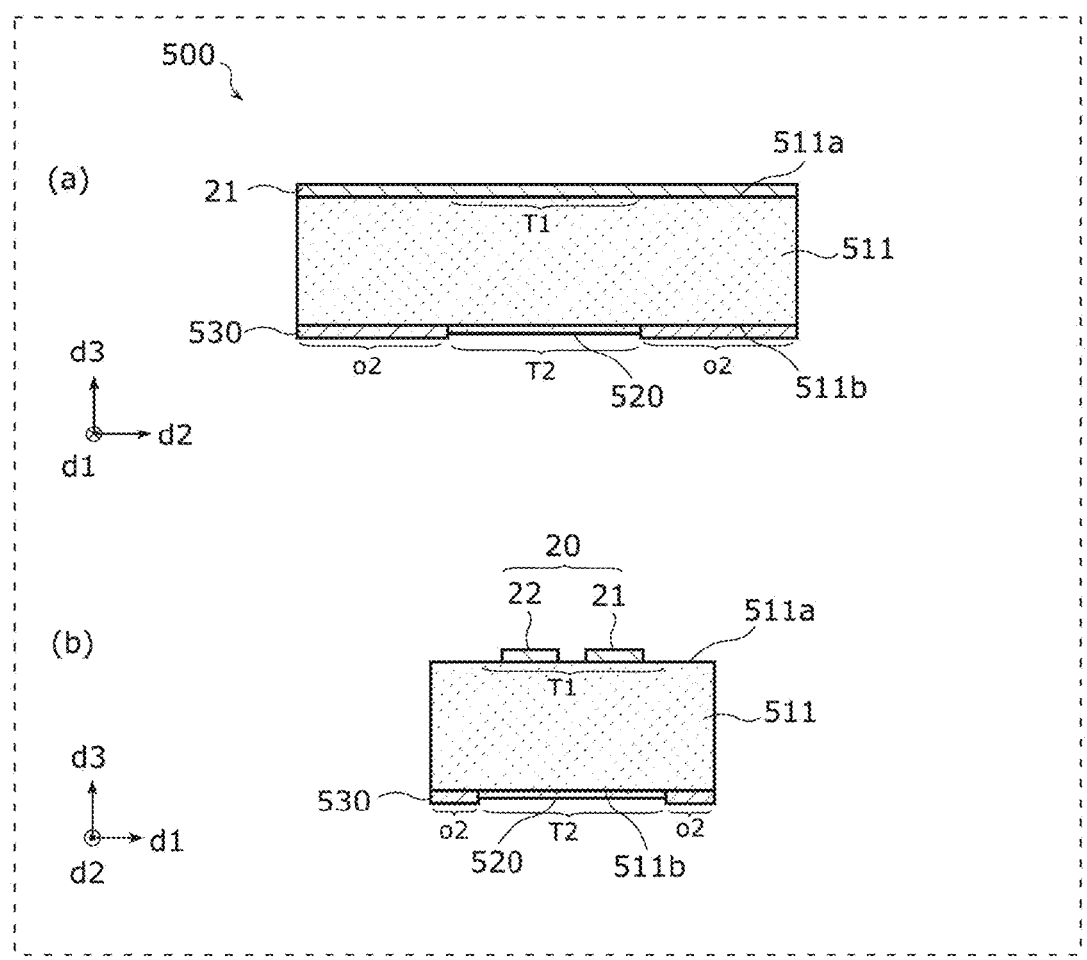
FIG. 15 illustrates cross sectional views each illustrating the multilayer substrate in Example.

FIG. 14 is a plan view illustrating multilayer substrate 500 in Example that is an example of Embodiment 2. FIG. 15 illustrates cross sectional views each illustrating multilayer substrate 500 in Example. Part (a) of FIG. 15 illustrates a cross section of multilayer substrate 500 viewed along line XVa-XVa illustrated in FIG. 14, whereas (b) of FIG. 15 illustrates a cross section of multilayer substrate 500 viewed along line XVb-XVb illustrated in FIG. 14.

Multilayer substrate 500 in Example includes dielectric layer 511 and conductor layer 530. First line 21 and second line 22 are provided above one-side principal surface 511a of dielectric layer 511. Conductor layer 530 is provided in a portion of other-side principal surface 511b of dielectric layer 511.

Dielectric layer 511 has a thickness of 0.1 mm. Dielectric layer 511 has a relative dielectric constant of 4.2, and a dielectric dissipation factor of 0.019. First line 21 and second line 22 each have a thickness of 18 µm, a width (a length in first direction d1) of 0.1 mm, and a length of 10 mm in second direction d2. A space between first line 21 and second line 22 is 0.1 mm.

Multilayer substrate 500 in Example includes region T2 in which conductor layer 530 is not provided. Region T2 has a rectangular shape, a width (a length in first direction d1) of 1.0 mm, and a length in second direction d2 of 2.0 mm. Region T2 is provided directly under partial region T1 of differential signal wires 20. Conductor layer 530 is provided in region o2 surrounding the perimeter of region T2. Resist 520 is provided below other-side principal surface 511b of dielectric layer 511 in region T2. FIG. 15 illustrates a state in which resist 520 is provided only in region T2, yet actually, a resist (illustration thereof is omitted) is provided over the entire surface of multilayer substrate 500. For example, the resist has a thickness of 20 µm, a relative dielectric constant of 4.2, and a dielectric dissipation factor of 0.019.

Next, multilayer substrate 1500 included in an electronic control device according to Comparative Example 3 is to be described.

Figure 16:
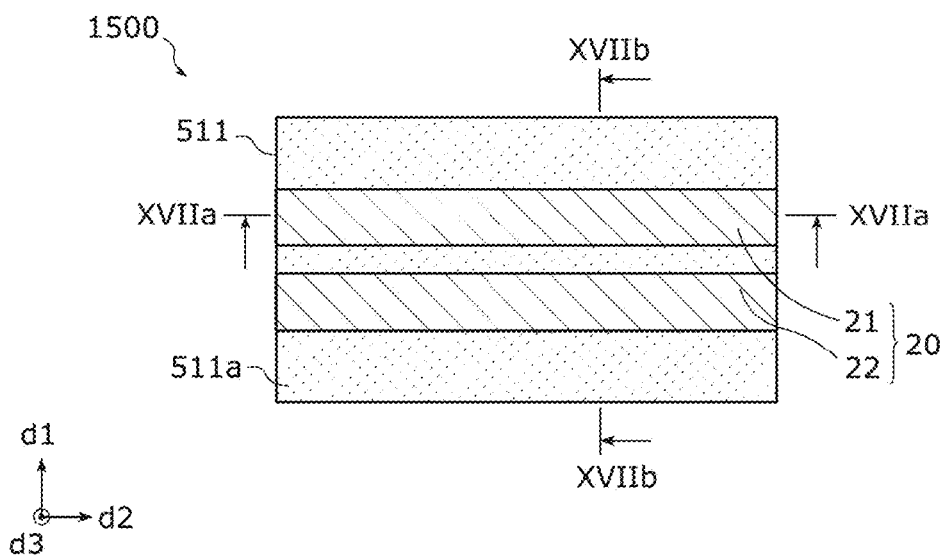
FIG. 16 is a plan view illustrating a multilayer substrate according to Comparative Example 3.
Figure 17:
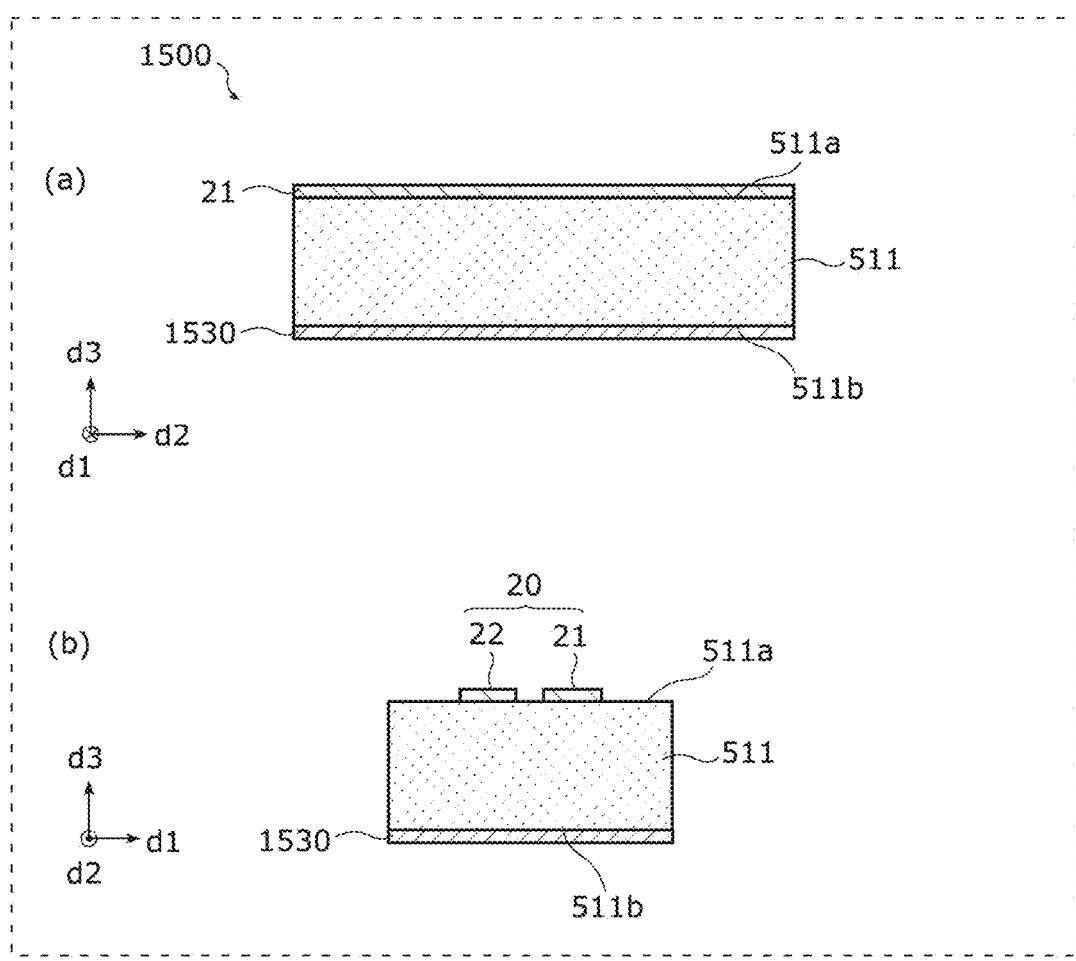
FIG. 17 illustrates cross sectional views each illustrating the multilayer substrate according to Comparative Example 3.

FIG. 16 is a plan view illustrating multilayer substrate 1500 according to Comparative Example 3. FIG. 17 illustrates cross sectional views each illustrating multilayer substrate 1500 according to Comparative Example 3. Part (a) of FIG. 17 illustrates a cross section of multilayer substrate 1500 viewed along line XVIIa-XVIIa illustrated in FIG. 16, whereas (b) of FIG. 17 illustrates a cross section of multilayer substrate 1500 viewed along line XVIIb-XVIIb illustrated in FIG. 16.

Multilayer substrate 1500 in Comparative Example 3 includes dielectric layer 511 and conductor layer 530. First line 21 and second line 22 are provided above one-side principal surface 511a of dielectric layer 511. Conductor layer 1530 is provided below other-side principal surface 511b of dielectric layer 511. Multilayer substrate 500 in Comparative Example 3 does not include region T2 in which conductor layer 530 is not provided. Thus, in Comparative Example 3, conductor layer 1530 is provided over entire other-side principal surface 511b of dielectric layer 511. Note that in Comparative Example 3, a resist (illustration thereof is omitted) is provided over the entire surface of multilayer substrate 500.

Figure 18:
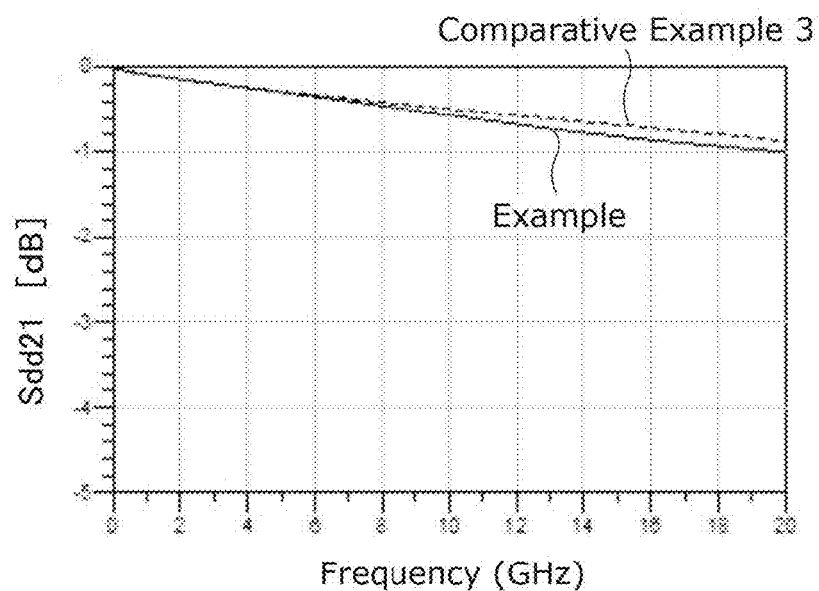
FIG. 18 illustrates passing characteristics of differential-mode signals in the multilayer substrates in Example and Comparative Example 3.

FIG. 18 illustrates passing characteristics of differential-mode signals in the multilayer substrates in Example and Comparative Example 3. The horizontal axis in the drawing indicates a frequency of a differential-mode signal. The vertical axis in the drawing indicates Sdd21 of a differential-mode signal, and shows that the lower a point on the vertical axis is, the more a signal is prevented from passing through.

As illustrated in FIG. 18, in Example, passing characteristics of differential-mode signals are equivalent to those in Comparative Example 3. As in Example, even when region T2 in which conductor layer 530 is not provided is provided in multilayer substrate 500, passing characteristics of differential-mode signals show almost no decrease. Note that when Sdd21 is to be made greater than or equal to that in Comparative Example 3, widths of first line 21 and second line 22 and a space therebetween need to be adjusted according to a relative dielectric constant, a dielectric dissipation factor, and a thickness of dielectric layer 510 used in multilayer substrate 500 and a thickness of the conductor layer used therein.

Figure 19:
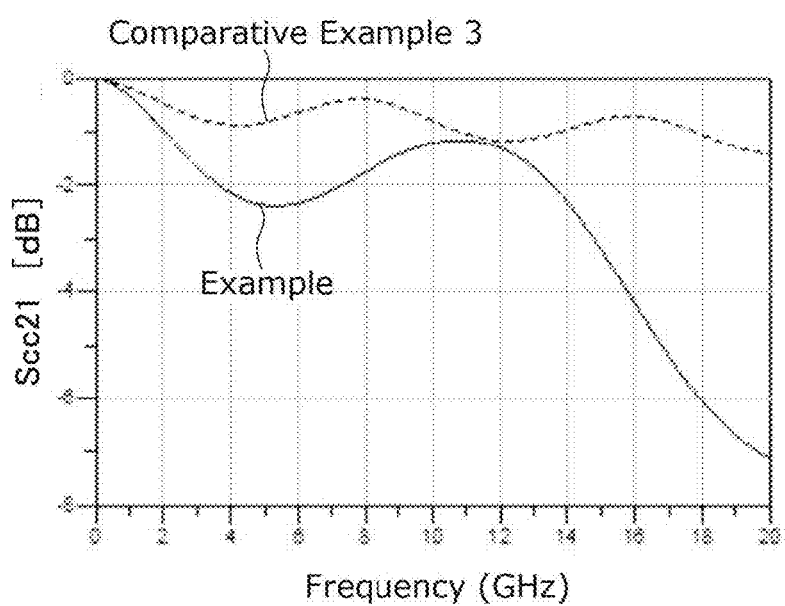
FIG. 19 illustrates passing characteristics of common-mode signals in the multilayer substrates in Example and Comparative Example 3.

FIG. 19 illustrates passing characteristics of common-mode signals in the multilayer substrates in Example and Comparative Example 3. The horizontal axis in the drawing indicates a frequency of a common-mode signal. The vertical axis in the drawing indicates Scc21 of a common-mode signal, and shows that the lower a point on the vertical axis is, the more a signal is prevented from passing through.

As illustrated in FIG. 19, in Example, signals are more prevented from passing through than that in Comparative Example 3 in a frequency range of 2 GHz to 10 GHz and a frequency range of at least 13 GHz, for example. By using such passing characteristics, common-mode noise signals can be prevented from passing through in a frequency range of 2 GHz to 10 GHz and a frequency range of at least 13 GHz, for example. Note that a band that prevents noise signals from passing through can be adjusted by using, in multilayer substrate 500, a dielectric having a relative dielectric constant and a dielectric dissipation factor different from those of dielectric 510 used in the present embodiment or by changing the length of region T2.

According to electronic control device 1C that includes multilayer substrate 500 according to Example, even when common-mode noise signals cannot be completely eliminated in protection circuit 5B, for example, common-mode noise signals can be prevented from passing through by using a partial region of multilayer substrate 500. Thus, a communication error can be prevented from being caused in electronic control device 1C.

Variation 1 of Embodiment 2

Electronic control device 1C according to Variation 1 of Embodiment 2 is to be described. In Variation 1, an example in which conductor layers 530 are not provided directly under differential signal wires 20, and are provided in locations distant from differential signal wires 20 is to be described.

Figure 20:
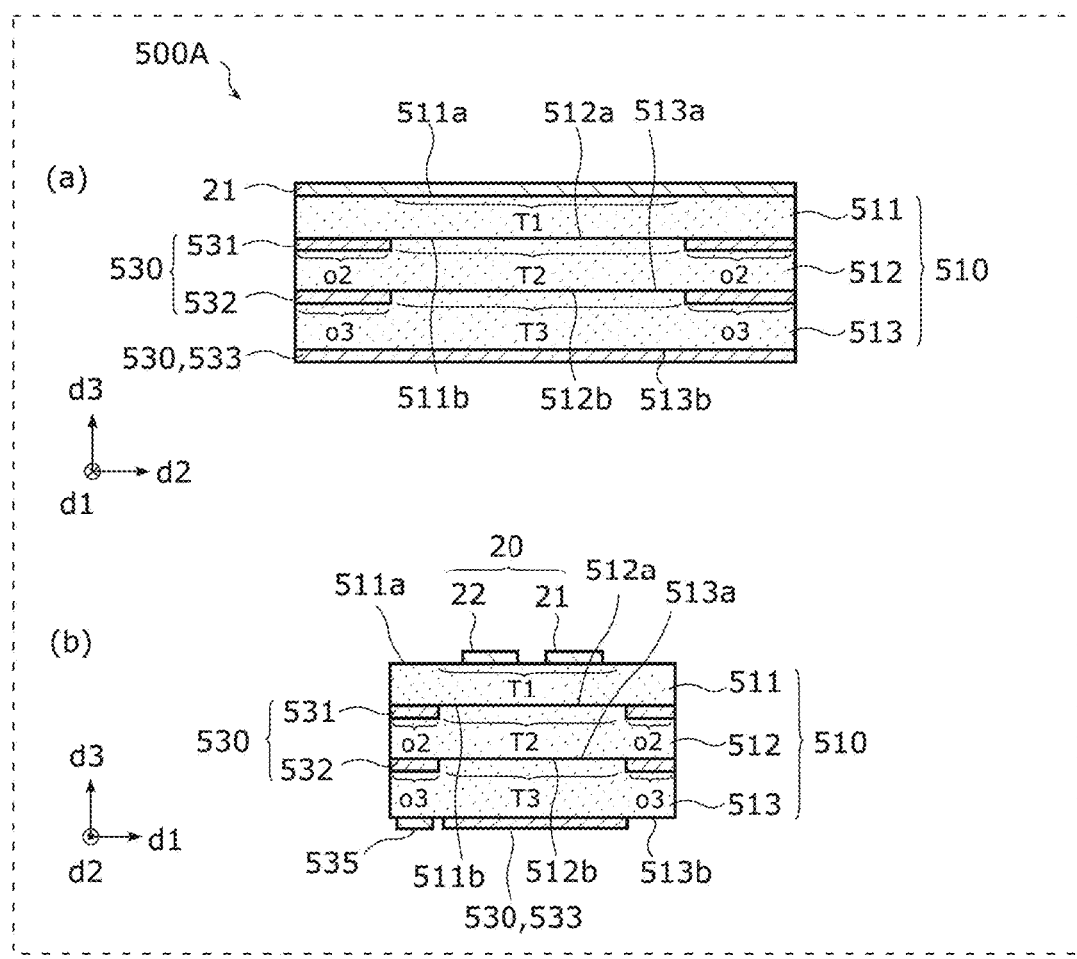
FIG. 20 illustrates cross sectional views each illustrating a portion of a multilayer substrate of an electronic control device according to Variation 1 of Embodiment 2.

FIG. 20 illustrates cross sectional views each illustrating a portion of multilayer substrate 500A of electronic control device 1C according to Variation 1 of Embodiment 2.

Multilayer substrate 500A in Variation 1 has a stack structure in which dielectric layers 510 and conductor layers 530 are stacked. First line 21 and second line 22 that are differential signal wires 20 are provided above multilayer substrate 500A.

Multilayer substrate 500A in Variation 1 also includes regions T2 and T3 in which conductor layers 530 are not provided, directly under partial region T1 of differential signal wires 20.

Multilayer substrate 500A in Variation 1 includes conductor layer 533 in a region further distant from a region directly under partial region T1 of differential signal wires 20. The region further distant from the region directly under differential signal wires 20 is in a location further distant from other-side principal surface 513b of dielectric layer 513, for example. Conductor layer 533 is provided below other-side principal surface 513b of dielectric layer 513 that is the lowermost layer of multilayer substrate 500A. Conductor layer 533 is a ground conductor layer, for example.

Multilayer substrate 500A in Variation 1 also includes regions T2 and T3 in which conductor layers 530 are not provided directly under partial region T1 of differential signal wires 20. With this configuration, at differential signal wires 20, common-mode impedance can be increased, and common-mode noise signals can be prevented from passing through. Thus, a communication error can be prevented from being caused in electronic control device 1C.

Variation 2 of Embodiment 2

Electronic control device 1C according to Variation 2 of Embodiment 2 is to be described. In Variation 2, an example in which differential signal wires 20 are each in a meandering shape is to be described.

Figure 21:
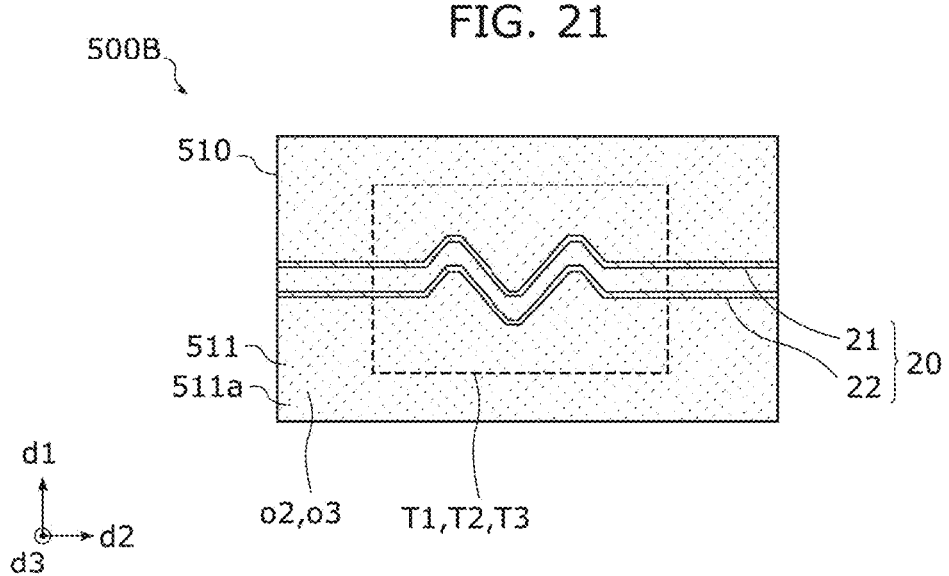
FIG. 21 is a plan view illustrating a portion of a multilayer substrate of an electronic control device according to Variation 2 of Embodiment 2.

FIG. 21 is a plan view illustrating a portion of multilayer substrate 500B of electronic control device 1C according to Variation 2 of Embodiment 2.

Multilayer substrate 500B in Variation 2 has a stack structure in which dielectric layers 510 and conductor layers 530 are stacked. First line 21 and second line 22 that are differential signal wires 20 are provided above multilayer substrate 500B. First line 21 and second line 22 are each in a meandering shape in partial region T1 of differential signal wires 20. The meandering shape may be a triangular wave shape, a square wave shape, or a sine wave shape.

Multilayer substrate 500B in Variation 2 also includes regions T2 and T3 in which conductor layers 530 are not provided, directly under partial region T1 of differential signal wires 20. In Variation 2, first line 21 and second line 22 are in a meandering shape, so that the lengths of first line 21 and second line 22 can be increased, and common-mode impedance can be increased. Accordingly, common-mode noise signals can be prevented from passing through, and thus a communication error can be prevented from being caused in electronic control device 1C.

Summary of Embodiment 2

Electronic control device 1C according to Embodiment 2 further includes: multilayer substrate 500 that includes a plurality of dielectric layers 510 and a plurality of conductor layers 530. Differential signal wires 20 that include first line 21 and second line 22 are provided above multilayer substrate 500. Multilayer substrate 500 includes region T2 in which the plurality of conductor layers 530 are not provided, region T2 being directly under partial region T1 of differential signal wires 20.

In this manner, by providing, directly under partial region T1 of differential signal wires 20, region T2 in which conductor layers 530 are not provided, common-mode impedance can be increased in partial region T1 of differential signal wires 20. Accordingly, common-mode noise signals can be prevented from passing through, and thus a communication error can be prevented from being caused in electronic control device 1C. Further, common-mode noise signals can be prevented from passing through, without providing additional components such as a common-mode choke coil, and thus the size of electronic control device 1C can be reduced.

The plurality of conductor layers 530 may be provided in perimeter region o2 of multilayer substrate 500, perimeter region o2 surrounding region T2 in which the plurality of conductor layers 530 are not provided.

In this manner, by using conductor layers 530, a ground potential can be given to or power can be supplied to an electronic component mounted on multilayer substrate 500, for example.

The plurality of dielectric layers 510 may be provided in region T2 in which the plurality of conductor layers 530 are not provided.

In this manner, since dielectric layer 510 is provided in region T2 in which conductor layers 530 are not provided, common-mode impedance in partial region T1 of differential signal wires 20 can be increased. Accordingly, common-mode noise signals can be prevented from passing through, and thus a communication error can be prevented from being caused in electronic control device 1C.

The plurality of conductor layers 530 provided in perimeter region o2 may be a plurality of ground conductor layers or a plurality of power-supply conductor layers.

In this manner, a ground potential can be given to or power can be supplied to an electronic component mounted on multilayer substrate 500, for example.

The plurality of conductor layers 533 may be provided in a region further distant from a region directly under partial region T1 of differential signal wires 20.

In this manner, by using conductor layer 533 in a region further distant from a region directly under region T1, a ground potential can be given to or power can be supplied to electronic components mounted on multilayer substrate 500A, for example.

First line 21 and second line 22 may each be in a meandering shape in partial region T1 of differential signal wires 20.

In this manner, since first line 21 and second line 22 are formed into a meandering shape, the lengths of first line 21 and second line 22 can be increased, and common-mode impedance can be increased. Accordingly, common-mode noise signals can be prevented from passing through, and thus a communication error can be prevented from being caused in electronic control device 1C.

Other Embodiments

The above has described electronic control devices according to embodiments and variations of the present disclosure, yet the present disclosure is not limited to the embodiments and the variations described above. The scope of the present disclosure also encompasses embodiments resulting from applying various modifications, which may be conceived by those skilled in the art, to the embodiments and the variations and other embodiments resulting from combining some elements in the embodiments and the variations, without departing from the gist of the present disclosure.

INDUSTRIAL APPLICABILITY

An electronic control device according to the present disclosure is useful as an electronic control device for use in various electronic devices and communication systems.

REFERENCE SIGNS LIST 1, 1A, 1B, 1C electronic control device
5, 5A, 5B protection circuit
10 connector
11 first input-output terminal
12 second input-output terminal
20 differential signal wire
21 first line
22 second line
25 control signal wire
31 first ground line
32 second ground line
33 third ground line
34 fourth ground line
40 multilayer-varistor component
41 first signal terminal
42 second signal terminal
43 ground terminal
50 transceiver IC
60 microprocessor
90 harness
500, 500A, 500B multilayer substrate
510, 511, 512, 513 dielectric layer
511a, 512a, 513a one-side principal surface
511b, 512b, 513b other-side principal surface
520 resist
530, 531, 532, 533 conductor layer
535 wiring layer
C1 first capacitor element
C2 second capacitor element
CP1 first capacitance
CP2 second capacitance
d1 first direction
d2 second direction
d3 third direction
G ground
n1, n2, n3, n4 node
o2, o3 perimeter region
T1, T2, T3 region
ZNR1 first varistor element
ZNR2 second varistor element

The invention claimed is:

1. An electronic control device comprising:
a first input-output terminal and a second input-output terminal through which differential signals are input and output;
a transceiver integrated circuit (IC) that transmits and receives the differential signals;
a first line that connects the first input-output terminal and the transceiver IC;
a second line that connects the second input-output terminal and the transceiver IC;
a first varistor element provided on a first ground line that connects the first line and the ground;
a second varistor element provided on a second ground line that connects the second line and the ground;
a first capacitor element connected in parallel to the first varistor element; and
a second capacitor element connected in parallel to the second varistor element,
wherein a first capacitance that is a capacitance between the first line and a ground is at least 80 pF and at most 220 pF,
a second capacitance that is a capacitance between the second line and the ground is at least 80 pF and at most 220 pF,
the first capacitance is a sum of a capacitance of the first varistor element and a capacitance of the first capacitor element, and
the second capacitance is a sum of a capacitance of the second varistor element and a capacitance of the second capacitor element.

2. The electronic control device according to claim 1, wherein the first capacitance is a capacitance of the first varistor element, and
the second capacitance is a capacitance of the second varistor element.

3. The electronic control device according to claim 1, wherein the first varistor element and the second varistor element are provided in a single multilayer-varistor component.

4. The electronic control device according to claim 3, wherein the single multilayer-varistor component includes:
a first signal terminal connected to the first line, the first signal terminal being one terminal of the first varistor element;
a second signal terminal connected to the second line, the second signal terminal being one terminal of the second varistor element; and
a ground terminal connected to the ground, the ground terminal being a common terminal that serves as both an other terminal of the first varistor element and an other terminal of the second varistor element.

5. The electronic control device according to claim 1, wherein a difference between the first capacitance and the second capacitance is at most 10%.

6. The electronic control device according to claim 1, wherein no common-mode noise filter is provided between the first input-output terminal and the transceiver IC, and
no common-mode noise filter is provided between the second input-output terminal and the transceiver IC.

7. The electronic control device according to claim 1, further comprising:
a multilayer substrate that includes a plurality of dielectric layers and a plurality of conductor layers, wherein differential signal wires that include the first line and the second line are provided above the multilayer substrate, and the multilayer substrate includes a region in which the plurality of conductor layers are not provided, the region being directly under a partial region of the differential signal wires.

8. The electronic control device according to claim 7, wherein the plurality of conductor layers are provided in a perimeter region of the multilayer substrate, the perimeter region surrounding the region in which the plurality of conductor layers are not provided.

9. The electronic control device according to claim 8, wherein the plurality of dielectric layers are provided in the region in which the plurality of conductor layers are not provided.

10. The electronic control device according to claim 8, wherein the plurality of conductor layers provided in the perimeter region are a plurality of ground conductor layers or a plurality of power-supply conductor layers.

11. The electronic control device according to claim 7, wherein the plurality of conductor layers are provided in a region further distant from a region directly under the partial region of the differential signal wires.

12. The electronic control device according to claim 7, wherein the first line and the second line are each in a meandering shape in the partial region of the differential signal wires.

13. An electronic control device comprising:
a first input-output terminal and a second input-output terminal through which differential signals are input and output;
a transceiver integrated circuit (IC) that transmits and receives the differential signals;
a first line that connects the first input-output terminal and the transceiver IC;
a second line that connects the second input-output terminal and the transceiver IC;
a first varistor element provided on a first ground line that connects the first line and the ground; and
a second varistor element provided on a second ground line that connects the second line and the ground,
wherein a first capacitance that is a capacitance between the first line and a ground is at least 80 pF and at most 220 pF,
a second capacitance that is a capacitance between the second line and the ground is at least 80 pF and at most 220 pF,
the first capacitance is a capacitance of the first varistor element, the second capacitance is a capacitance of the second varistor element, and
the first varistor element and the second varistor element are provided in a single multilayer-varistor component.

14. The electronic control device according to claim 13, wherein the single multilayer-varistor component includes:
a first signal terminal connected to the first line, the first signal terminal being one terminal of the first varistor element;
a second signal terminal connected to the second line, the second signal terminal being one terminal of the second varistor element; and
a ground terminal connected to the ground, the ground terminal being a common terminal that serves as both an other terminal of the first varistor element and an other terminal of the second varistor element.

15. The electronic control device according to claim 13, wherein a difference between the first capacitance and the second capacitance is at most 10%.

16. The electronic control device according to claim 13, wherein no common-mode noise filter is provided between the first input-output terminal and the transceiver IC, and
no common-mode noise filter is provided between the second input-output terminal and the transceiver IC.

17. The electronic control device according to claim 13, further comprising:
a multilayer substrate that includes a plurality of dielectric layers and a plurality of conductor layers,
wherein differential signal wires that include the first line and the second line are provided above the multilayer substrate, and
the multilayer substrate includes a region in which the plurality of conductor layers are not provided, the region being directly under a partial region of the differential signal wires.

18. The electronic control device according to claim 17, wherein the plurality of conductor layers are provided in a perimeter region of the multilayer substrate, the perimeter region surrounding the region in which the plurality of conductor layers are not provided.

19. The electronic control device according to claim 17, wherein the plurality of conductor layers are provided in a region further distant from a region directly under the partial region of the differential signal wires.

20. The electronic control device according to claim 17, wherein the first line and the second line are each in a meandering shape in the partial region of the differential signal wires.

* * * * *